US012694846B2

(12) United States Patent
Tomizawa et al.

(10) Patent No.: US 12,694,846 B2
(45) Date of Patent: Jul. 28, 2026

(54) DISPLAY DEVICE

(71) Applicant: Magnolia White Corporation, Tokyo (JP)

(72) Inventors: Kazunari Tomizawa, Tokyo (JP); Takeo Koito, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 19/097,610

(22) Filed: Apr. 1, 2025

(65) Prior Publication Data

US 2025/0308476 A1 Oct. 2, 2025

(30) Foreign Application Priority Data

Apr. 2, 2024 (JP) ................................. 2024-059712

(51) Int. Cl.
| | |
|---|---|
| *G09G 3/36* | (2006.01) |
| *G06F 3/01* | (2006.01) |
| *G09G 3/00* | (2006.01) |

(52) U.S. Cl.
CPC ........... *G09G 3/3611* (2013.01); *G06F 3/013* (2013.01); *G09G 3/001* (2013.01); *G09G 2320/028* (2013.01); *G09G 2354/00* (2013.01)

(58) Field of Classification Search
CPC ................. G09G 3/3611; G09G 3/001; G09G 2320/028; G09G 2354/00; G06F 3/013
See application file for complete search history.

(56) References Cited

U.S. PATENT DOCUMENTS

| | | | |
|---|---|---|---|
| 2006/0098281 A1 | 5/2006 | Fukushima et al. | |
| 2010/0277657 A1 | 11/2010 | Fukushima et al. | |
| 2020/0280639 A1* | 9/2020 | Yamada ............. | H04N 1/00196 |
| 2023/0260433 A1* | 8/2023 | Tomizawa ........... | G02B 6/0035 345/204 |
| 2024/0036367 A1* | 2/2024 | Tomizawa ........... | H04N 13/378 |

FOREIGN PATENT DOCUMENTS

JP 3865762 B2 1/2007

* cited by examiner

*Primary Examiner* — Afroza Chowdhury
(74) *Attorney, Agent, or Firm* — K&L Gates LLP

(57) ABSTRACT

A display device includes: a display panel with pixels; a light source with light emission points; an acquirer configured to acquire information on viewpoints of a user; a storage configured to store image data; and a controller configured to control image display based on the information. The controller selects one piece of image data and display the one piece of the image data by controlling some of the pixels to transmit light, which are located on straight lines connecting the light emission points and the viewpoints. When first image data corresponding to a first positional relation between the display panel and the viewpoints is not stored in the storage, the controller causes the image generator to generate, based on two pieces of image data corresponding to second positional relations close to the first positional relation, second image data corresponding to the first positional relation and selects the second image data.

7 Claims, 24 Drawing Sheets

Figure 12:
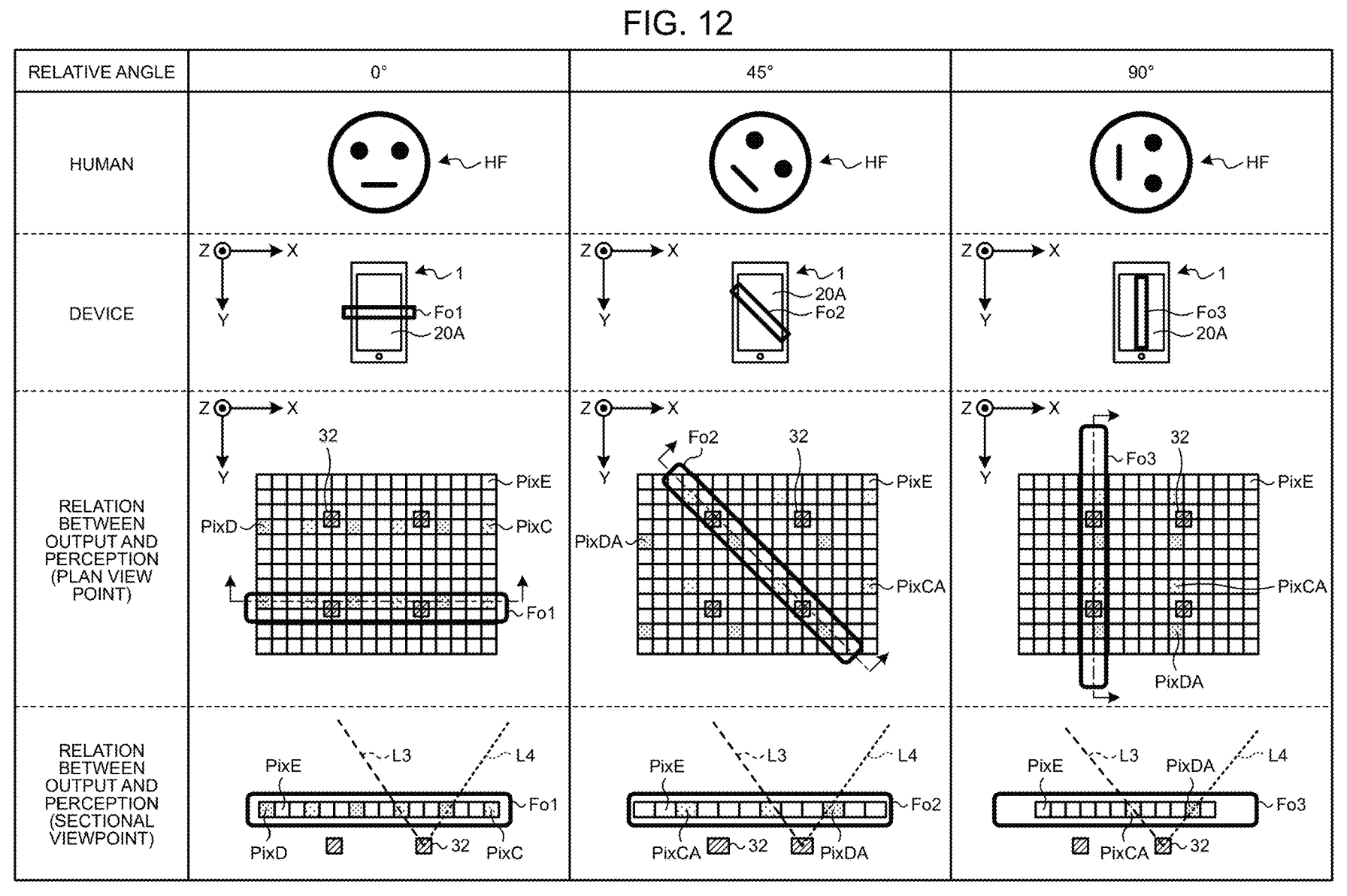

| RELATIVE ANGLE | 0° | 45° | 90° |
|---|---|---|---|
| HUMAN | | | |
| DEVICE | | | |
| RELATION BETWEEN OUTPUT AND PERCEPTION (PLAN VIEW POINT) | | | |
| RELATION BETWEEN OUTPUT AND PERCEPTION (SECTIONAL VIEWPOINT) | | | |

| rot<0 | rot>0 |
|---|---|
| | |

FIG. 26

DISPLAY DEVICE

CROSS-REFERENCE TO RELATED APPLICATION

This application claims the benefit of priority from Japanese Patent Application No. 2024-059712 filed on Apr. 2, 2024, the entire contents of which are incorporated herein by reference.

BACKGROUND

1. Technical Field

What is disclosed herein relates to a display device.

2. Description of the Related Art

As disclosed in Japanese Patent No. 3865762, a display device capable of performing display output of individual images to a plurality of viewpoints by using an image separator such as a parallax barrier is known.

With an image separator such as a parallax barrier, the arrangement direction of a plurality of viewpoints to which images can be individually output is fixed. However, the relation between the arrangement direction of a plurality of viewpoints and a display device is not necessarily unchanged. For example, the relation between a display device provided on a portable terminal device such as a smartphone and the arrangement direction of the eyes of a user viewing the display device is not fixed. With an image separator such as a parallax barrier, it has been impossible to perform display output of individual images to a plurality of viewpoints, depending on the relation between the arrangement direction of the viewpoints and the display device. When individual images are displayed to a plurality of viewpoints, images prepared in advance do not necessarily correspond to the positions of the viewpoints, and thus improvement has been desired also for the accuracy of adaptation of displayed images to the positional relation between the display device and the viewpoints.

For the foregoing reasons, there is a need for a display device capable of more flexibly adapting to the relation between the arrangement direction of a plurality of viewpoints and the display device and more highly accurately adapting displayed images to the positional relation between the display device and the viewpoints.

SUMMARY

According to an aspect, a display device includes: a display panel provided with a plurality of pixels; a light source provided with a plurality of light emission points and configured to emit light to the pixels of the display panel; an acquirer configured to acquire information related to a plurality of viewpoints of a user viewing the display panel; a storage configured to store a plurality of pieces of image data provided to be selectable in accordance with the positional relation between the display panel and the viewpoints; and a controller configured to control image display through operation of the pixels based on the information. A ratio of a pitch between the pixels arranged in a predetermined direction and a pitch between the light emission points in the predetermined direction is 1:4n or 1:6n, and n is a natural number. The information includes information related to the positions of the viewpoints and information indicating an arrangement direction of the viewpoints. The controller selects, based on a relative rotation angle between the display panel and the arrangement direction and a relative positional relation between each viewpoint and each light emission point, one piece of image data corresponding to the relative positional relation between the pieces of image data stored in the storage; and displays the one piece of the image data by controlling some of the pixels to transmit light, which are located on straight lines connecting the light emission points and the viewpoints. The controller includes an image generator. When first image data corresponding to a first positional relation between an image display surface of the display panel and the viewpoints is not stored in the storage, the controller causes the image generator to generate, based on two pieces of image data corresponding to second positional relations close to the first positional relation among the pieces of image data stored in the storage, second image data corresponding to the first positional relation and selects the second image data.

BRIEF DESCRIPTION OF THE DRAWINGS

FIG. 6 is a schematic diagram illustrating Examples A and B of the relative angle relation between a human face and the display device including the display panel;

FIG. 7 is a schematic diagram illustrating an example of the angle difference between the face and the display panel with respect to a vertical line and a horizontal line;

FIG. 8 is a schematic diagram illustrating an example of the relation between the relative angle and the feasibility of individual image output to a plurality of viewpoints by applying control of pixels Pix along the X direction to first pixels PixC and second pixels PixD, which is described above with reference to FIGS. 3 and 4;

FIG. 9 is a schematic diagram illustrating another example of the relation between the relative angle and the feasibility of individual image output to a plurality of viewpoints by applying control of pixels Pix along the X direction to the first pixels PixC and second pixels PixD, which is described above with reference to FIGS. 3 and 4;

FIG. 12 is a schematic diagram illustrating an example of the relation between the relative angle and the feasibility of individual images output to a plurality of viewpoints in a case where disposition control described above with reference to FIGS. 10 and 11 is reflected;

FIG. 26 is a diagram illustrating, as an interpolation example, an example of flow of processing performed as interpolation processing in the oblique direction in the case of rot<0.

DETAILED DESCRIPTION

An embodiment of the present disclosure is described below with reference to the drawings. What is disclosed herein is only an example, and any modifications that can be easily conceived by those skilled in the art while maintaining the main purpose of the disclosure are naturally included in the scope of the present disclosure. The drawings may be schematically represented in terms of the width, thickness, shape, etc., of each part compared to those in the actual form for the purpose of clearer explanation, but they are only examples and do not limit the interpretation of the present disclosure. In the present specification and the drawings, the same reference sign is applied to the same elements as those already described for the previously mentioned drawings, and detailed explanations may be omitted as appropriate.

Figure 1:
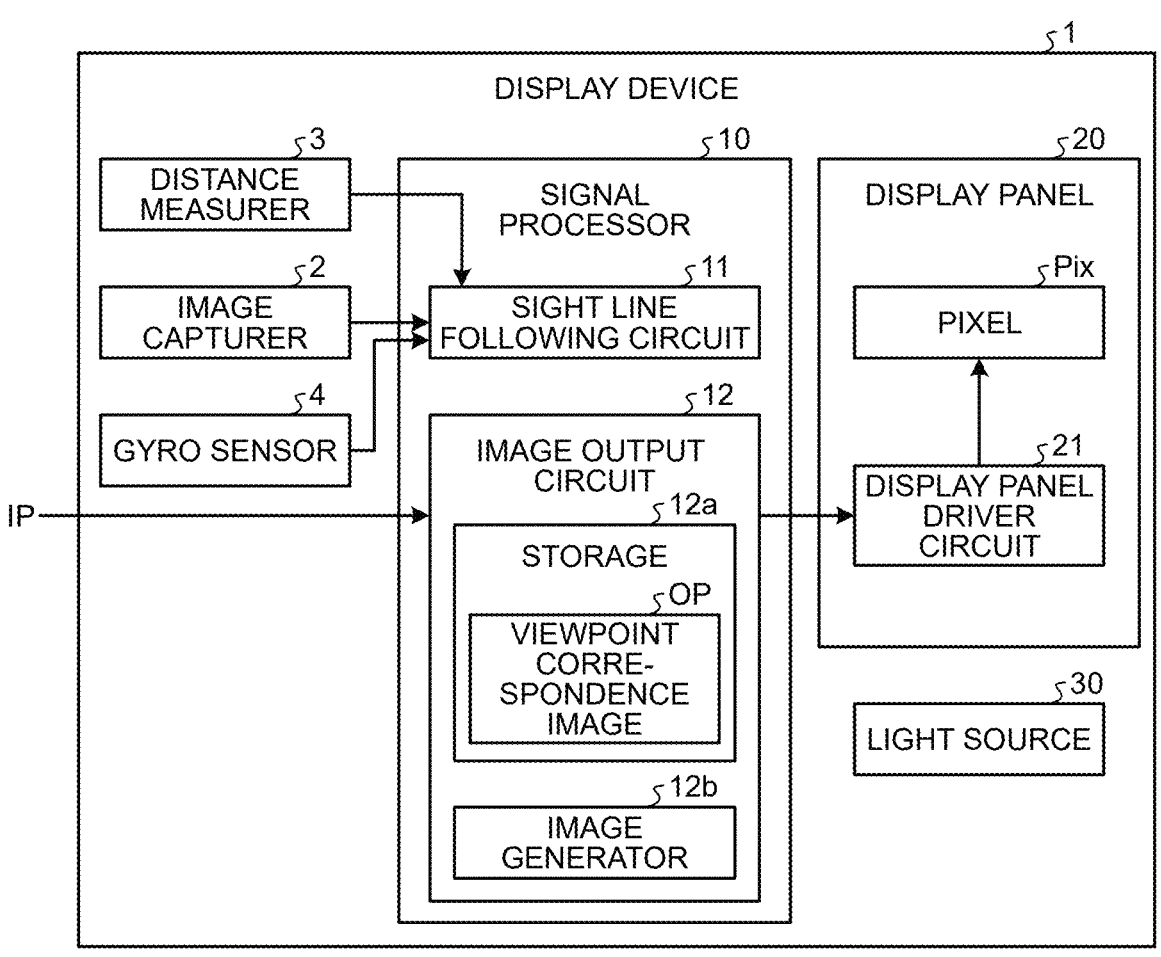
FIG. 1 is a block diagram illustrating a main configuration of a display device.

FIG. 1 is a block diagram illustrating a main configuration of a display device 1. The display device 1 includes an image capturer 2, a distance measurer 3, a signal processor 10, a display panel 20, and a light source 30. The display device 1 is an information processing device (information processing terminal device) such as a smartphone, which has an image capturing function of the image capturer 2, a distance measurement function of the distance measurer 3, and an image display output function of the signal processor 10, the display panel 20, and the light source 30.

The image capturer 2 captures images. Specifically, the image capturer 2 includes an image capturing element such as a complementary metal oxide semiconductor (CMOS) image sensor. The image capturer 2 generates image data based on an electric signal output from the image capturing element.

The distance measurer 3 measures the distance between the display device 1 and an image capturing target that the image capturer 2 faces. Specifically, the distance measurer 3 includes a light emitter and a light sensor constituting a time-of-flight (ToF) sensor, for example. The distance measurer 3 including such a ToF sensor performs distance measurement based on the time difference between a light emission timing at which the light emitter emits light and a sensing timing at which a laser beam emitted by the light emitter is sensed by the light sensor after reflection by the target to be image-captured. A specific mechanism with which the distance measurer 3 performs distance measurement is not limited to the above-described configuration, may be a mechanism using an auto focus (AF) function of a camera, such as what is called a contrast AF. In such a mechanism, the AF function may be used to set, as a distance measured by the distance measurer 3, a distance identified by the AF function of the image capturer 2 to be a distance at which an image is focused. In an embodiment, the image capturer 2 and the distance measurer 3 cooperatively function as an acquirer that acquires information indicating the positions of two viewpoints (a first viewpoint E1 (right eye) and a second viewpoint E2 (left eye) to be described later) of a user facing the display panel 20.

The image capturer 2 is provided with the assumption of capturing an image of the user viewing an image display surface of the display panel 20. The distance measurer 3 is provided with the assumption of measuring the distance between the image display surface of the display panel 20 and the user viewing the image display surface. Specifically, the image capturer 2 and the distance measurer 3 are disposed on, for example, a side closer to one surface of a housing of the display device 1 where the image display surface of the display panel 20 is exposed.

The signal processor 10 includes a sight line following circuit 11 and an image output circuit 12. The sight line following circuit 11 acquires information related to the position of the user's viewpoint relative to the display panel 20 based on outputs from the image capturer 2 and the distance measurer 3. The information related to the viewpoint position will be described later in detail.

The image output circuit 12 outputs image data corresponding to the viewpoint position to the display panel 20 based on the information related to the viewpoint position acquired by the sight line following circuit 11. The image data output from the image output circuit 12 may be, for example, image data based on an image signal IP input to the display device 1 from external information processing but may be image data stored in advance in a storage device included in the display device 1.

The image output circuit 12 of the embodiment includes a storage 12a and an image generator 12b. The storage 12a stores viewpoint correspondence image data OP. The image generator 12*b* references two pieces of image data included in the viewpoint correspondence image data OP and performs interpolation processing of the two pieces of image data to generate image data. The image generator 12*b* of the embodiment outputs image data included in the viewpoint correspondence image data OP or image data generated by the image generator 12*b* to the display panel 20 as image data corresponding to the viewpoint position acquired by the sight line following circuit 11 in the viewpoint correspondence image data OP.

Figure 2:
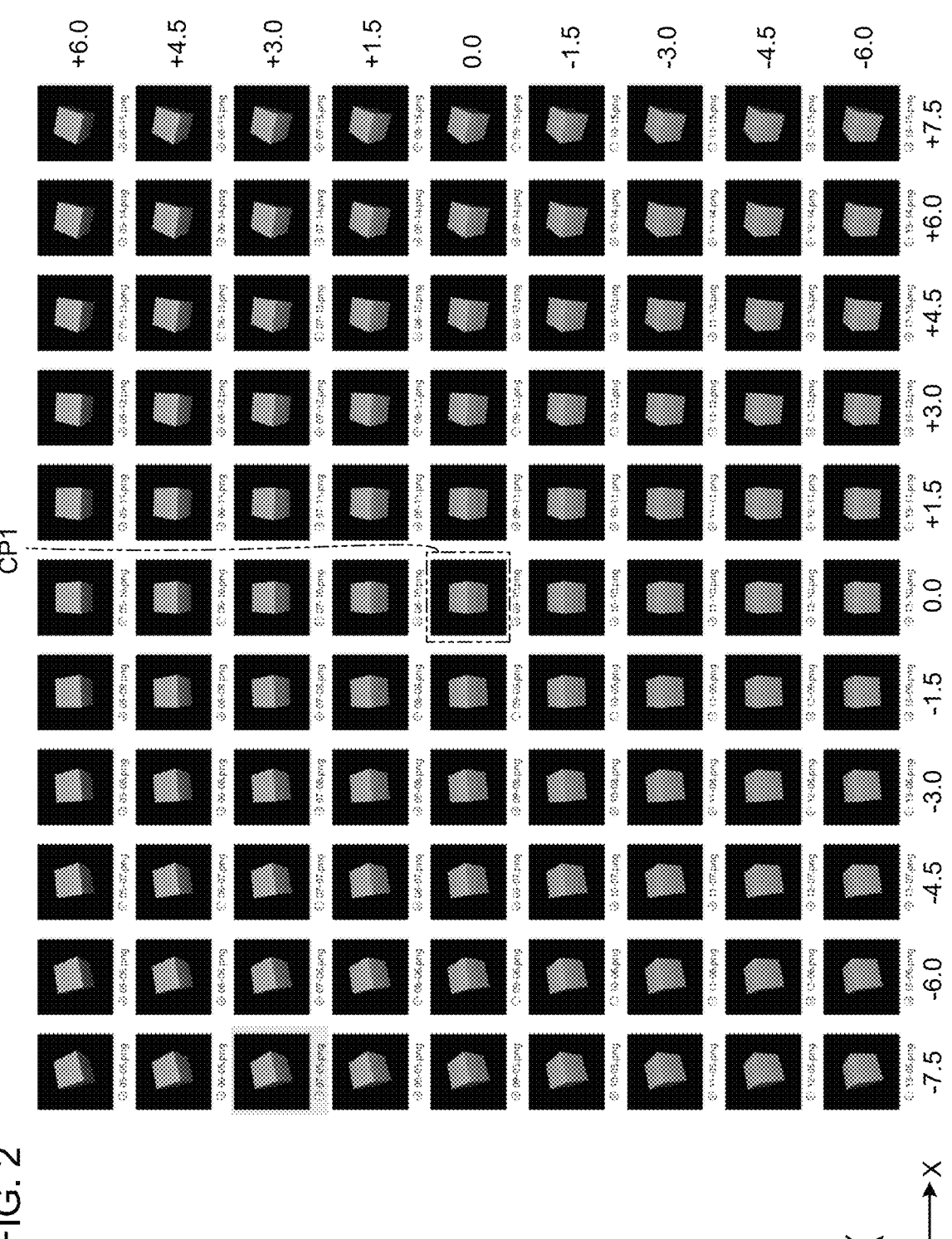
FIG. 2 is a diagram illustrating an example of viewpoint correspondence image data.

FIG. 2 is a diagram illustrating an example of the viewpoint correspondence image data OP. As illustrated in FIG. 2, a plurality of pieces of image data are included in the viewpoint correspondence image data OP. The pieces of image data included in the viewpoint correspondence image data OP correspond to different viewpoints, respectively.

Specifically, the viewpoint correspondence image data OP includes a plurality of pieces of image data disposed in a matrix having a row-column configuration in an X direction and a Y direction. The X and Y directions as the arrangement directions of the pieces of image data included in the viewpoint correspondence image data OP correspond to X and Y directions of the display panel 20. Each piece of image data includes a plurality of pieces of pixel data disposed in a matrix having a row-column configuration in a "bx" direction and a "by" direction (refer to FIG. 23, for example). The "bx" direction corresponds to the X direction, and the "by" direction corresponds to the Y direction.

The viewpoint correspondence image data OP is provided with coordinates corresponding to the magnitude of the angle between an image display surface 200 (refer to FIG. 3) of the display panel 20 and the user's viewpoints (for example, the first viewpoint E1 and the second viewpoint E2) in a case where 0 degrees is defined to be the vertical direction of the image display surface 200. In the embodiment, the coordinates are individually provided in the X and Y directions. In FIG. 2 and the other diagrams, tilt in the X direction when it is regarded that the angle of the user's sight line relative to the image display surface 200 is tilted to one side in the X direction with respect to a center image data CP1 as a center is indicated by a coordinate such as "+1.5", "+3", "+4.5", "+6", and "+7.5" with the step of 1.5 degrees in between. Tilt in the X direction when it is regarded that the angle of the user's sight line relative to the image display surface 200 is tilted to the other side in the X direction with respect to the center image data CP1 as a center is indicated by a coordinate such as "−1.5", "−3", "−4.5", "−6", and "−7.5" with the step of 1.5 degrees in between. Tilt in the Y direction when it is regarded that the angle of the user's sight line relative to the image display surface 200 is tilted to one side in the Y direction with respect to the center image data CP1 as a center is indicated by coordinates such as "+1.5", "+3", "+4.5", "+6", and "+7.5" with the step of 1.5 degrees in between. Tilt in the Y direction when it is regarded that the angle of the user's sight line relative to the image display surface 200 is tilted to the other side in the Y direction with respect to the center image data CP1 as a center is indicated by coordinates such as "−1.5", "−3", "−4.5", "−6", and "−7.5" with the step of 1.5 degrees in between. When the user's viewpoint is positioned in the vertical direction from a center point HP (refer to FIG. 18) corresponding to the center of the image display surface 200 in the X and Y directions, the center image data CP1 is selected as image data corresponding to the viewpoint.

As described above with reference to FIG. 2, in the embodiment, coordinates with the center image data CP1 as a center are allocated to each piece of image data; and the magnitude of the angle between the image display surface 200 and the user's viewpoints, in other words, the angle of the line of sight to the image display surface 200, is represented as the coordinates. The center image data CP1 is one piece of image data selected when the angle between the image display surface 200 and the user's viewpoints is 0 degrees. In the following description, the unit angle of the line of sight, which corresponds to the coordinate step in each of the X and Y directions in the viewpoint correspondence image data OP, is referred to as an angle Dltθ. In the example illustrated in FIG. 2, the angle Dltθ is 1.5 (°).

Although image data in the Portable Network Graphics (PNG) format is exemplarily illustrated in FIG. 2, the format and the number of pieces of image data included in the viewpoint correspondence image data OP are not limited to those illustrated in FIG. 2 but are changeable as appropriate. When interpolation processing by the image generator 12*b* is unnecessary, the image output circuit 12 outputs, to the display panel 20, image data corresponding to the viewpoint position acquired by the sight line following circuit 11 in the viewpoint correspondence image data OP including a plurality of pieces of image data as exemplarily illustrated in FIG. 2.

As illustrated in FIG. 1, the display panel 20 includes a display panel driver circuit 21. The display panel driver circuit 21 includes a circuit such as a display driver integrated circuit (DDIC), which performs various kinds of processing related to image display output of the display panel 20. The display panel driver circuit 21 drives a plurality of pixels Pix included in the display panel 20 in accordance with the image data output from the image output circuit 12.

Figure 3:
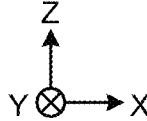
FIG. 3 is a schematic diagram illustrating a multilayered structure included in a display panel.

FIG. 3 is a schematic diagram illustrating a multilayered structure included in the display panel 20. As illustrated in FIG. 3, the display panel 20 includes a first substrate 22 and a second substrate 23. The first substrate 22 and the second substrate 23 are light-transmitting substrates such as glass substrates. The first substrate 22 and the second substrate 23 are stacked with a liquid crystal layer interposed therebetween. The liquid crystal layer is sealed between the first substrate 22 and the second substrate 23. The display panel 20 is what is called a liquid crystal display panel.

Hereinafter, a direction in which the first substrate 22 and the second substrate 23 face each other is referred to as a Z direction. One of two directions orthogonal to the Z direction is referred to as an X direction, and the other is referred to as a Y direction. The X and Y directions are orthogonal to each other.

A multilayered structure is formed on a surface of the first substrate 22 on the second substrate 23 side. The multilayered structure is made of a plurality of layers including, for example, a first electrode layer in which a plurality of pixel electrodes are formed, a second electrode layer in which a common electrode provided with a reference potential for the pixels Pix is formed, a circuit formation layer in which a switching element for individually transmitting a signal to each pixel electrode, wiring coupled to the switching element, and the like are formed, and insulating layers insulating these layers from each other. The pixel electrodes are individually provided for sub pixels included in the pixels Pix. When driven under control by the display panel driver circuit 21, the pixels Pix are controlled so that the alignment direction of liquid crystal molecules overlapping the position of each pixel electrode at a plan view point becomes a direction in accordance with the potential difference between the common electrode and the pixel electrode. The plan view point is a viewpoint at which a plane (X-Y plane) orthogonal to the Z direction is viewed from the front.

Figure 16:
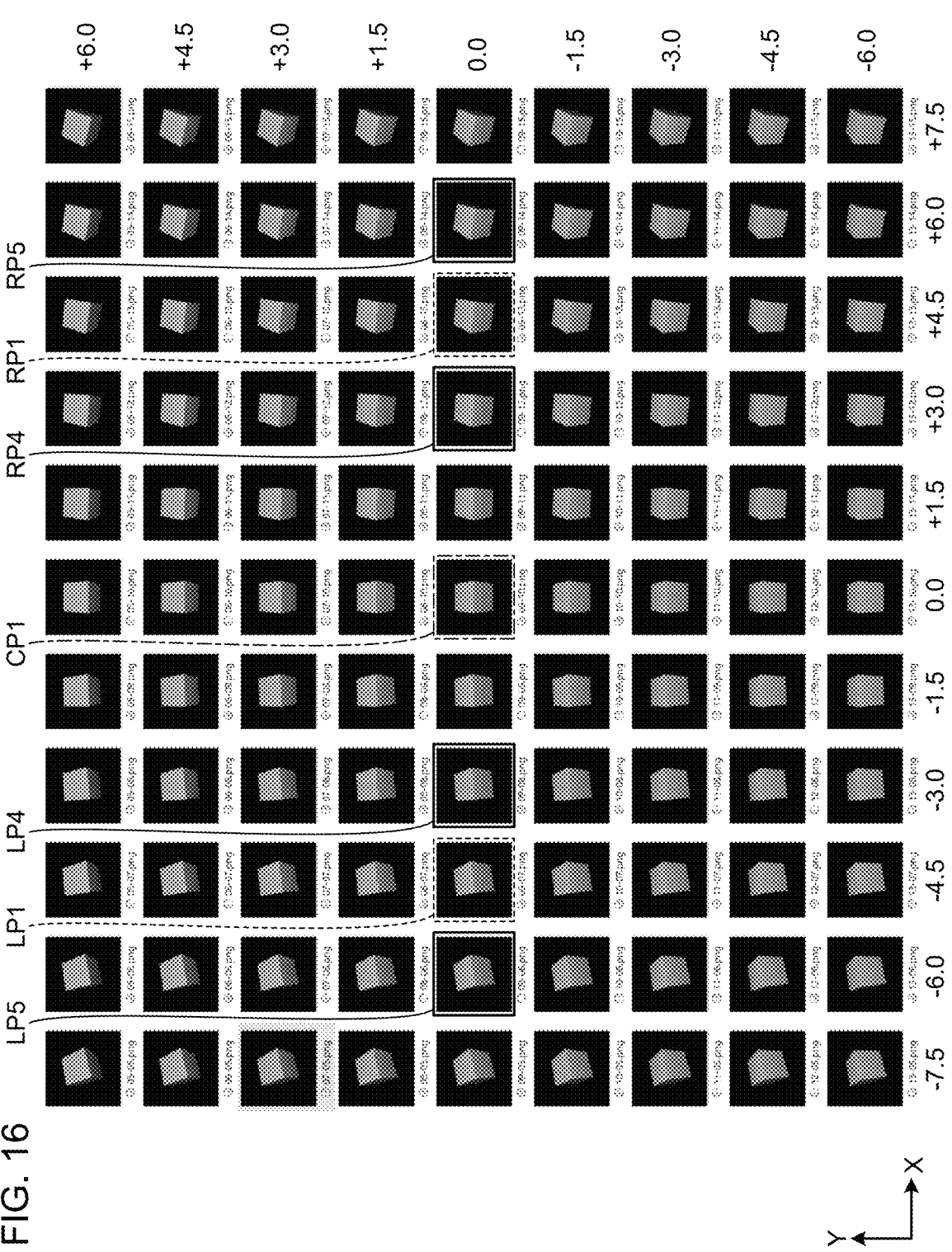
FIG. 16 is a diagram illustrating an example of change patterns of display output corresponding to the relative positional relation change illustrated in FIG. 15.

As illustrated in FIG. 16 to be described later or the like, each pixel Pix includes a plurality of sub pixels. For example, each pixel Pix includes a sub pixel provided with a color filter that transmits light in red (R), a sub pixel provided with a color filter that transmits light in green (G), and a sub pixel provided with a color filter that transmits light in blue (B). It is not essential that each pixel Pix includes all of these sub pixels, but for example, one of two pixels Pix adjacent to each other may include sub pixels in some colors among sub pixels in a plurality of colors, and the other pixel Pix may include sub pixels in the other colors. Some or all pixels Pix may include sub pixels provided with color filters that transmit light in colors different from the colors exemplarily described above. A sub pixel provided with a colorless filter or no color filter may further be provided, where light from this sub pixel is perceived as, for example, white (W). When a pixel Pix includes the above-described three sub pixels, the shape of the pixel Pix is preferably a square (with equal lengths in the X and Y directions), but may be a rectangular shape in which either sides in the X direction or sides in the Y direction are longer than the other sides.

For example, the color filters individually provided for the sub pixels included in each pixel Pix, and a black matrix that functions as a partition between the color filters for respective sub pixels, are provided in the second substrate 23. The common electrode may be provided in the second substrate 23 instead of the first substrate 22.

A pixel pitch PP illustrated in FIG. 3 is the width of one second pixel Pix2 in the X direction. Although first pixels Pix1 and second pixels Pix2 are distinctly illustrated in FIG. 3, the first pixels Pix1 and the second pixels Pix2 are pixels Pix with the same configuration and have no configuration difference therebetween. Thus, the width of each pixel Pix in the X direction is the pixel pitch PP. Precisely, the pixel pitch PP in the X-direction is the distance between the X-directional center point of one side of a black matrix surrounding one pixel Pix and the X-directional center point of the other side thereof, wherein the one side is positioned on one end side of the one pixel Pix in the X direction, and the other side is positioned on the other end side of the one pixel Pix in the X direction. Alternatively, the pixel pitch may be the center-to-center distance between the sub pixels for the same color in respective pixels adjacent to each other when viewed in the X direction.

The display panel 20 faces the light source 30 with a polarization layer 24 and a spacer 40 interposed therebetween. The polarization layer 24 is provided on the first substrate 22 side (display panel back surface side) in the display panel 20. The spacer 40 is a light-transmitting member having a plate shape and disposed to face the first substrate 22 with the polarization layer 24 interposed therebetween, and is, for example, glass. A bonding layer 42 is interposed between the spacer 40 and the polarization layer 24. The bonding layer 42 bonds the polarization layer 24 and the spacer 40 together. When a support member that holds the interval between the light source 30 and the polarization layer 24 can be provided, a configuration in which a space layer is provided between them may be employed.

The light source 30 includes a planar light source 31, light emission points 32, and a light-shielding member 33 as illustrated in, for example, FIG. 3. The planar light source 31 is a planar light source that emits light from at least a surface on the display panel 20 side. With an exemplary specific configuration, the planar light source 31 includes, for example, a light guiding plate facing the display panel 20 in the Z direction, and a light source element (for example, light emitting diode (LED)) configured to emit light to the light guiding plate in a direction orthogonal to the Z direction. Disposition of the planar light source 31 illustrated in FIG. 3 indicates disposition of the light guiding plate, and illustration of the light source element is omitted. The light emission points 32 are holes provided through the light-shielding member 33. The light-shielding member 33 covers a surface of the planar light source 31 on the spacer 40 side except for places where the light emission points 32 are formed. A bonding layer 43 is interposed between the light-shielding member 33 and the spacer 40. The bonding layer 43 bonds the polarization layer 24 and the spacer 40 together. The bonding layers 42 and 43 are light-transmitting functional films having double-sided adhesive properties, such as optical clear adhesive (OCA). The light source 30 emits light generated by the planar light source 31 to the display panel 20 through the light emission points 32.

A light emission point pitch SpP illustrated in FIG. 3 is the interval between the X-directional center lines of respective light emission points 32 adjacent to each other in the X direction. The light emission point pitch SpP is 4n times or 6n times the pixel pitch PP. The number n is a natural number. The number n is, for example, 1 but may be equal to or larger than 2. FIG. 3 exemplarily illustrates a case where the light emission point pitch SpP is four times the pixel pitch PP. An opening diameter SS illustrated in FIG. 3 is the opening diameter of each light emission point 32 at the plan view point. The opening diameter SS is equal to or smaller than the pixel pitch PP. More specifically, the light emission point 32 preferably has a planar shape that is the same as the shape of each pixel Pix or is similar to and smaller than the shape of each pixel Pix (refer to FIG. 11, for example).

As described above, the image output circuit 12 outputs, to the display panel 20, image data corresponding to the viewpoint position acquired by the sight line following circuit 11 in the viewpoint correspondence image data OP. The display panel 20 performs display output corresponding to the image data. Accordingly, the display panel 20 displays an image corresponding to the viewpoint position acquired by the sight line following circuit 11. FIG. 3 schematically illustrates the display panel 20 performing display output of images individually corresponding to the first viewpoint E1 and the second viewpoint E2. The first pixels Pix1 are pixels Pix controlled to perform display output of an image corresponding to the first viewpoint E1. The second pixels Pix2 are pixels Pix controlled to perform display output of an image corresponding to the second viewpoint E2.

The first viewpoint E1 corresponds to the right eye of the user. The second viewpoint E2 corresponds to the left eye of the user. A middle point CP is the middle point on a straight line between the first viewpoint E1 and the second viewpoint E2. The position of the middle point CP typically corresponds to the position of the nose of the user in the arrangement direction of the first viewpoint E1 and the second viewpoint E2. FIG. 3 illustrates a case where the arrangement direction of the first viewpoint E1 and the second viewpoint E2 is the X direction. When the distance between the first viewpoint E1 and the middle point CP in the X direction and the distance between the second viewpoint E2 and the middle point CP in the X direction are a distance D1 and the distance between the first viewpoint E1 and the second viewpoint E2 in the X direction is a distance D2, the distance D2 is twice as long as the distance D1.

Coordinates representing the position of the middle point CP with respect to a predetermined origin of the display panel 20 can be expressed as (pos_x, pos_y, pos_h). The symbol "pos_x" represents the coordinate of the middle point CP in the X direction. The symbol "pox_y" represents the coordinate of the middle point CP in the Y direction. The symbol "pox_h" represents the position of the middle point CP in the Z direction. The coordinates in the X and Y directions of the predetermined origin of the display panel 20 may correspond to, for example, the position of one of the four apexes of a display region that has a quadrilateral shape at the plan view point and in which the pixels Pix are disposed on the display panel 20. Alternatively, the origin may be the center of this display region of the display panel 20. The position of the predetermined origin of the display panel 20 in the Z direction may correspond to a position on a center line of the pixels Pix (for example, the first pixels Pix1 and the second pixels Pix2 illustrated in FIG. 3) in the Z direction. Specifically, the center line of the pixels Pix in the Z direction is the center line of the liquid crystal layer sealed between the first substrate 22 and the second substrate 23 in the Z direction, and is preferably set at, for example, the height position of d/2 where the symbol "d" represents a cell gap of the display panel 20. The position of the predetermined origin of the display panel 20 is not limited thereto but may be an arbitrary position. Hereinafter, unless otherwise stated, the term "origin" means the predetermined origin of the display panel 20.

The sight line following circuit 11 identifies the positions of the two eyes (right and left eyes) of the user, who is included in an image captured by the image capturer 2, in the captured image. The identification is performed based on, for example, pattern matching but not limited thereto, and may be performed based on, for example, image identification using machine learning or the like. Information indicating the relation between a position in an image capturing area of the captured image and its X-directional and Y-directional coordinates is held by the signal processor 10 in advance and prepared to be able to be referred by the sight line following circuit 11. The sight line following circuit 11 regards the middle point between the right and left eyes in the image captured by the image capturer 2 as the middle point CP and identifies the X-directional and Y-directional coordinates of the middle point CP. Such a method of identifying the position of the middle point CP is merely exemplary, and the present disclosure is not limited thereto, and the method may be changed as appropriate. For example, the sight line following circuit 11 may identify the middle point CP based on the positional relation between the position of the nose of the user and the positions of the two eyes (right and left eyes) of the user included in the image captured by the image capturer 2. The sight line following circuit 11 acquires a distance value measured by the distance measurer 3 as the value of pos_h. The sight line following circuit 11 regards the middle point between the right and left eyes in the image captured by the image capturer 2 as the middle point CP and sets the position of the middle point CP in the Z direction as pos_h. In this manner, the sight line following circuit 11 derives information related to the viewpoint position.

Light emitted from each light emission point 32 reaches the first viewpoint E1 and the second viewpoint E2. A first pixel Pix1 is positioned on a ray line L1 of light reaching the first viewpoint E1 from each light emission point 32. A second pixel Pix2 is positioned on a ray line L2 of light reaching the second viewpoint E2 from each light emission point 32. An image output by the first pixels Pix1 is different from an image output by the second pixels Pix2. The image output from the first pixels Pix1 is based on image data corresponding to the position of the first viewpoint E1. The image output from the second pixels Pix2 is based on image data corresponding to the position of the second viewpoint E2. More specifically, for example, the image data of 09-12.png in FIG. 2 is employed as an image for the right-eye viewpoint, the image data of 09-08.png is employed as an image for the left-eye viewpoint, and these images are combined by the signal processor and displayed as one image (stereoscopic viewing display image). More specifically, on condition that the stereoscopic viewing display image, 09-08.png, and 09-12.png have the same number of pixels, when, for example, a left-eye image, a left-eye image, a right-eye image, and a right-eye image need to be sequentially displayed at the pixels (n, m+1) (which means the (m+1)-th pixel on the n-th row; the same is applied to the rest of this paragraph), (n, m+2), (n, m+3), and (n, m+4) on a pixel row of the stereoscopic viewing display image, pixel signals corresponding to (n, m+1) and (n, m+2) of the left-eye image data 09-08.png are used for pixels (signals) corresponding to (n, m+1) and (n, m+2) of the stereoscopic viewing display image. Similarly, pixel signals corresponding to (n, m+3) and (n, m+4) of the right-eye image data 09-12.png are used for pixels (signals) corresponding to (n, m+3) and (n, m+4) of the stereoscopic viewing display image. Depending on the relation between the user's viewpoint position and each light source (light emission point 32), some pixels Pix do not need to display an image. In such a case, an image (for example, black image) with the lowest luminance is displayed by such pixels Pix. The image output circuit 12 outputs image data including image data corresponding to a plurality of viewpoints (for example, the first viewpoint E1 and the second viewpoint E2) to the display panel 20, to perform such image display output.

The distance between the center line of a pixel Pix in the Z direction and the middle point CP in the Z direction can be expressed as a distance Ph. The magnitude of the distance Ph corresponds to the magnitude of the value of pos_h described above. The distance between the center line of the pixel Pix in the Z direction and the emission start point of light from a light emission point 32 in the Z direction can be expressed as a distance Th. The distance Th is significantly small as compared to the distance Ph. In view of this point, the center line of the pixel Pix in the Z direction may be defined on the same plane as the pixel electrode or may be defined on the same flat plate shape as the back or front surface of the second substrate 23 or the front surface of a cover glass provided on the display panel 20. In the embodiment, the position in the Z direction of the emission start point of light from the light emission point 32 is on the boundary line between the light-shielding member 33 and the bonding layer 43.

Figure 4:
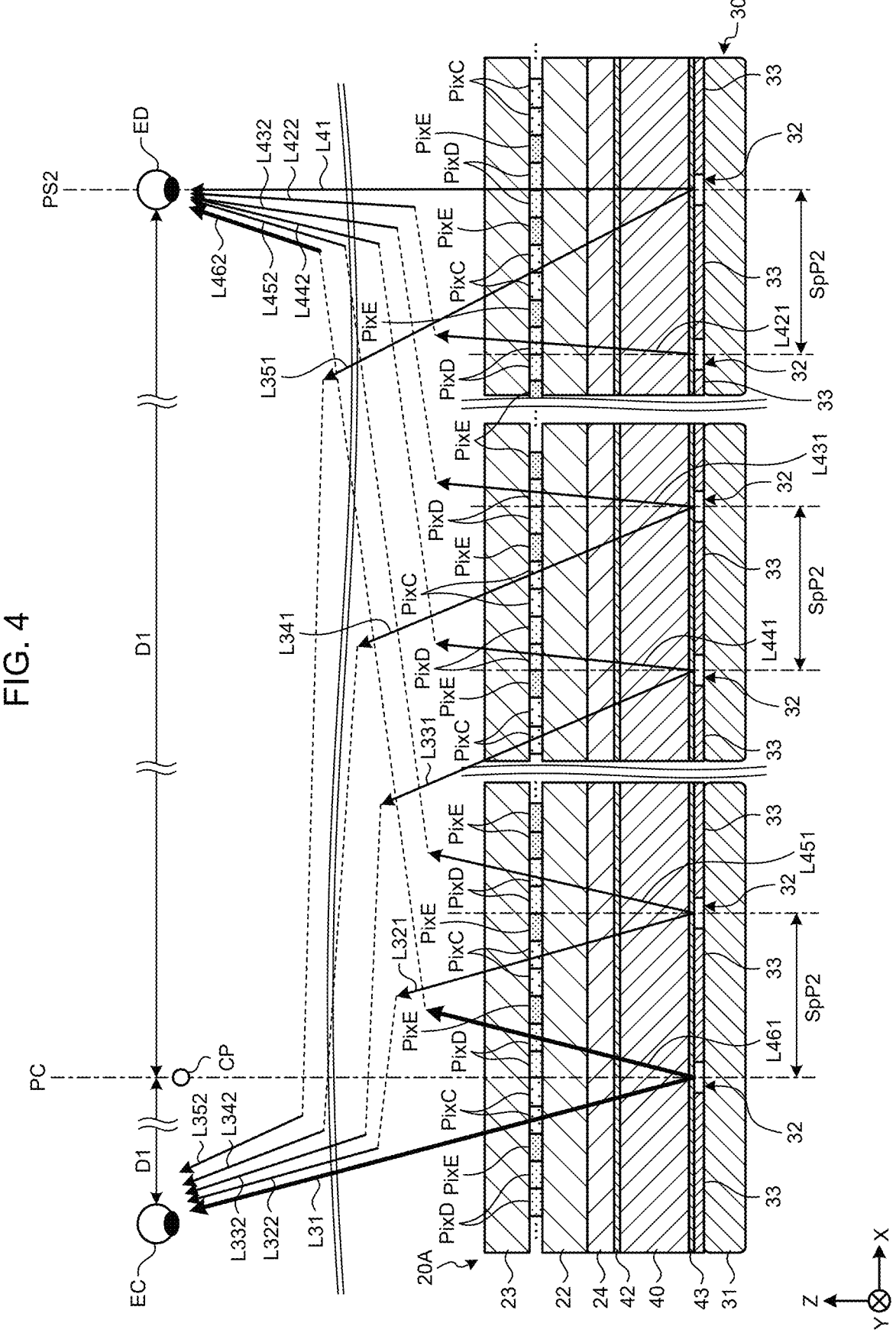
FIG. 4 is a sectional view illustrating an example in which the light emission point pitch is six times the pixel pitch.

The following describes, with reference to FIG. 4, the relation between the light emission point pitch (for example, light emission point pitch SpP or light emission point pitch SpP2) between light emission points 32 adjacent to each other in the X direction and the pitch (pixel pitch PP) between pixels Pix arranged in the X direction and the relation between the light emission point pitch and light emitted from each light emission point 32 to each of a plurality of viewpoints. FIG. 4 is a sectional view illustrating a section of a display panel 20A along a plane (X-Z plane) orthogonal to the Y direction, like the display panel 20 in FIG. 3. The display panel 20 illustrated in FIG. 1 may be the display panel 20A illustrated in FIG. 4 and subsequent diagrams.

FIG. 4 is a sectional view illustrating an example in which the light emission point pitch SpP2 is six times the pixel pitch PP unlike the light emission point pitch SpP illustrated in FIG. 3. In FIG. 4 and other diagrams referred in description of the embodiment, a ray line L (m) 1 and a ray line L (m) 2 coupled to each other through a dashed line constitute one ray line of light in reality. For example, a ray line L321 is part of the ray line L (m) 1 in the case of m=32, and represents the ray line of light just having emitted from one light emission point 32. A ray line L322 is part of the ray line L (m) 2 in the case of m=32 and indicates a state in which the ray line is reaching a first viewpoint EC. The same manner of illustration applies in the subsequent diagrams, and this should be understood as a way of illustrating the relation between the display panel 20 and each viewpoint in one diagram since the distance therebetween is significantly large as compared to the pixel pitch PP or the like. In FIG. 4, m is a natural number of 32 to 35 or a natural number of 42 to 45. The ray line of light in a case where m is a natural number of 32 to 35 and a ray line L31 are each the ray line of light reaching the first viewpoint EC through a first pixel PixC. The ray line of light in a case where m is a natural number of 42 to 45 and a ray line L41 are each the ray line of light reaching a second viewpoint ED through a second pixel PixD. In FIG. 4, a line extending in the Z direction and passing through the second viewpoint ED is illustrated as a dashed and single-dotted line PS2.

The first viewpoint EC is one of the first viewpoint E1 and the second viewpoint E2 (refer to FIG. 3). The second viewpoint ED is the other of the first viewpoint E1 and the second viewpoint E2. When the first viewpoint EC is the first viewpoint E1, the first pixels PixC are the first pixels Pix1 (refer to FIG. 3). When the second viewpoint ED is the second viewpoint E2, the second pixels PixD are the second pixels Pix2 (refer to FIG. 3).

As illustrated in FIG. 4, the display panel 20A has a configuration in which six pixels Pix are arranged in the light emission point pitch SpP2, which is the interval between the X-directional center lines of two light emission points 32 adjacent to each other in the X direction. The X-directional positions of the X-directional center lines of the two light emission points 32 each overlap the X-directional position of the boundary line between two pixels Pix adjacent to each other in the X direction at the plan view point.

For example, as illustrated in FIG. 4, two of the six pixels Pix are controlled as the first pixels PixC. Another two of the six pixels Pix are controlled as the second pixels PixD. The other pixels Pix corresponding to none of the first pixels PixC and the second pixels PixD among the six pixels Pix are referred to as third pixels PixE. The third pixels PixE are pixels Pix with the lowest light transmission degree (for example, black display).

As illustrated with the ray line L41, the ray line of light reaching the second viewpoint ED through a second pixel PixD at a position facing the second viewpoint ED in the Z direction extends in the Z direction. In other words, the ray line of light from a light emission point 32 facing the second viewpoint ED in the Z direction extends in the Z direction. In FIG. 4, a line extending in the Z direction and passing through the second viewpoint ED is illustrated as the dashed and single-dotted line PS2. As illustrated with ray lines L42, L43, L44, L45, and L46, the ray line of light reaching the second viewpoint ED from a light emission point 32 at a position separated in the X direction from a reference light emission point 32 that emits light along the ray line L41 has a larger tilt angle in the Z direction as the distance from the light emission point 32 in the X direction is larger. Among the plurality of pixels Pix, pixels Pix to be controlled as second pixels PixD are determined based on such a ray line of light. With a similar approach, as indicated with the relation between the ray lines L31, L32, L33, L34, L35, and L36 and the first pixels PixC, among the plurality of pixels Pix, pixels Pix to be controlled as the first pixels PixC are determined based on the ray line of light emitted from the light emission point 32 and reaching the first viewpoint EC.

However, in some places, it is not necessarily appropriate to dispose pixels Pix to be controlled as the second pixels PixD at equal intervals in the X direction depending on the difference between the tilt angles of the ray lines L42, L43, L44, L45, and L46 with respect to the Z direction. With a similar approach, in some places, it is not necessarily appropriate to dispose pixels Pix to be controlled as the first pixels PixC at equal intervals in the X direction. The third pixels PixE may be disposed as appropriate in correspondence with such disposition control of the first pixels PixC and the second pixels PixD, or the degree of light transmission may be controlled for each sub pixel as described later with reference to FIG. 17 and other diagrams. With such disposition control, the probability of crosstalk occurrence can be more reliably reduced.

In FIG. 4, the middle point CP is positioned on a dashed and single-dotted line PC overlapping the center line of one light emission point 32 in the X direction, but the position of the middle point CP overlapping the center line of the light emission point 32 in the X direction is not essential. The correspondence relation between the following: light from each light emission point 32; the positional relation between a first viewpoint EC and a second viewpoint ED in accordance with the position of the middle point CP; and control of the pixels Pix as first pixels PixC and second pixels PixD is the same as described above with reference to FIG. 4 irrespective of the position of the middle point CP.

Figure 5:
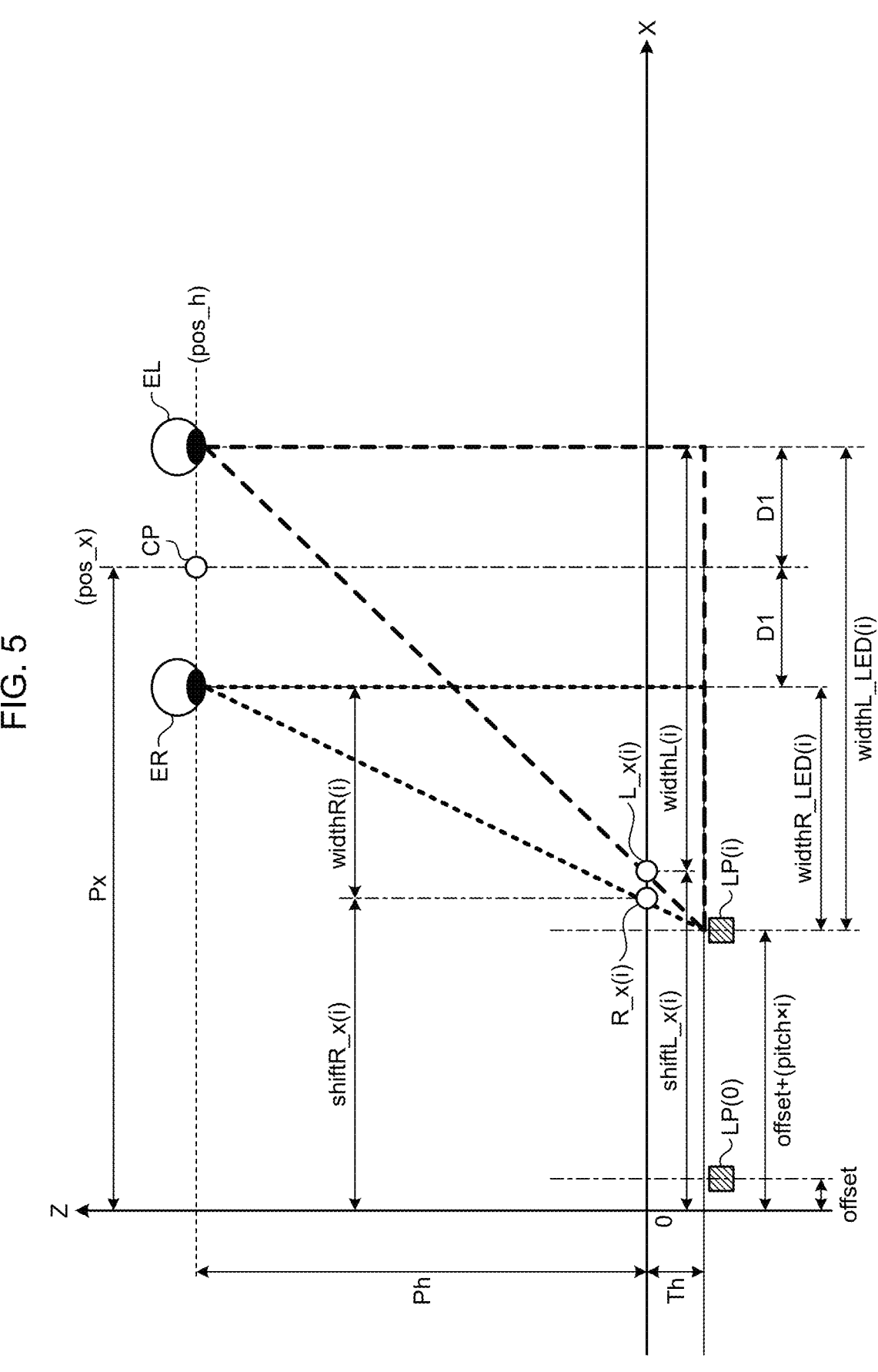
FIG. 5 is a diagram illustrating various parameters related to determination of the X-directional coordinate of a pixel positioned on the ray line extending from a light emission point, which is the (i+1)-th light emission point counted from the origin in an X direction, to a viewpoint.

The following describes the fundamental concept of driving control of pixels Pix in accordance with the relative positional relation between a viewpoint and the emission start point of a light with reference to FIG. 5.

FIG. 5 is a diagram illustrating various parameters related to determination of the X-directional coordinates R_x(i) and L_x(i) of pixels Pix positioned on the ray line extending from a light emission point LP(i), which is the (i+1)-th light emission point counted from the origin in the X direction, to the corresponding one of viewpoints ER and EL.

The light emission point LP(0) illustrated in FIG. 5 indicates the emission start point of light from a light emission point (for example, light emission point 32) disposed at a position (first position) closest to the origin in the X direction. The light emission point LP(i) indicates the emission start point of light from a light emission point disposed at the (i+1)-th closest position to the origin in the X direction. For example, in a case of i=1, the light emission point LP(1) indicates the emission start point of light from a light emission point disposed at the next closest position next to the light emission point LP(0) to the origin in the X direction, which means that the light emission point LP(1) indicates the secondary closest position. Thus, "i" is an integer equal to or larger than zero.

In FIG. 5, the distance between the origin and the light emission point LP(0) in the X direction is denoted by "offset". The distance between the origin and the light emission point LP(i) in the X direction can be expressed as "offset+(pitch×i)". The magnitude of the value "pitch" corresponds to the magnitude of the light emission point pitch SpP or the magnitude of the light emission point pitch SpP2 described above. The values "offset" and "offset+(pitch×i)"

are determined in advance in accordance with the design of the display device 1 and are parameters referrable in calculation related to determination of the X-directional coordinates R_x(i) and L_x(i).

The magnitude of the distance Ph described above with reference to FIG. 3 and illustrated in FIG. 5 corresponds to the magnitude of the value of pos_h. The magnitude of a distance Px illustrated in FIG. 5 corresponds to the magnitude of the value of pos_x. The distance between each of the light emission point LP(0) and the light emission point LP(i) and the origin in the Z direction is the distance Th described above. The values of pos_h and pos_x can be acquired by the image capturer 2 and the distance measurer 3.

Hereinafter, the distance between the origin and the coordinate R_x(i) in the X direction is denoted by shiftR_x(i). The distance between the coordinate R_x(i) and the viewpoint ER in the X direction is denoted by widthR(i). The distance between the light emission point LP(i) and the viewpoint ER in the X direction is denoted by widthR_LED(i). The viewpoint ER is the right-eye viewpoint of the user and is one of the first viewpoint E1 or EC and the second viewpoint E2 or ED.

The distance between the origin and the coordinate L_x(i) in the X direction is denoted by shiftL_x(i). The distance between the coordinate L_x(i) and the viewpoint EL in the X direction is denoted by widthL(i). The distance between the light emission point LP(i) and the viewpoint EL in the X direction is denoted by widthL_LED(i). The viewpoint EL is the left-eye viewpoint of the user and is the other of the first viewpoint E1 or EC and the second viewpoint E2 or ED.

The distance widthR_LED(i) can be expressed by Expression (1) below. In Expression (1) and other expressions, D1 is a value representing the magnitude of the distance D1 described above with reference to FIG. 3 and illustrated in FIG. 5. The value representing the magnitude of the distance D1 may be a predetermined value based on a typical user's average value. In the embodiment, the distance D1 is, for example, 31.25 millimeters (mm) but the present disclosure is not limited thereto, and the value may be changed as appropriate.

$$\text{widthR\_LED}(i) = \text{pos\_x} - D1 - \{\text{``offset''} + (\text{``pitch''} \times i)\} \qquad (1)$$

The distance widthR(i) can be expressed by Expression (2) below. In Expression (2) and other expressions, Th is a value representing the magnitude of the distance Th. The distance Th is determined in advance in accordance with the design of the display device 1. The concept for determining the distance Th in designing will be described later.

$$widthR(i) = \text{widthR\_LED}(i) \times \text{pos\_h}/(\text{pos\_h} + Th) \qquad (2)$$

The distance shiftR_x(i) can be expressed by Expression (3) below.

$$\text{shiftR\_x}(i) = \text{pos\_x} - D1 - widthR(i) \qquad (3)$$

The coordinate R_x(i) can be expressed by Expression (4) below. In Expression (4) and other expressions, PP is a value representing the magnitude of the pixel pitch PP. The pixel pitch PP is determined in advance in accordance with the design of the display device 1. In Expression (4) and other expressions, int( ) provides an integer value obtained by truncating the decimal portion of a value in the parentheses.

$$R\_x(i) = \text{int}\big(\text{shiftR\_x}(i)/PP\big) \qquad (4)$$

The distance widthL_LED(i) can be expressed by Expression (5) below.

$$\text{widthL\_LED}(i) = \text{pos\_x} + D1 - \{\text{``offset''} + (\text{``pitch''} \times i)\} \qquad (5)$$

The distance widthL(i) can be expressed by Expression (6) below.

$$widthL(i) = \text{widthL\_LED}(i) \times \text{pos\_h}/(\text{pos\_h} + Th) \qquad (6)$$

The distance shiftL_x(i) can be expressed by Expression (7) below.

$$\text{shiftL\_x}(i) = \text{pos\_x} + D1 - widthL(i) \qquad (7)$$

The coordinate L_x(i) can be expressed by Expression (8) below.

$$L\_x(i) = \text{int}\big(\text{shiftL\_x}(i)/PP\big) \qquad (8)$$

The display output control in accordance with the positions of the first viewpoint E1 or EC and the second viewpoint E2 or ED, which is described above with reference to FIGS. 3 and 4 can be achieved by setting a pixel Pix in disposition corresponding to R_x(i) as the first pixels Pix1 or PixC and setting a pixel Pix in disposition corresponding to L_x(i) as the second pixels Pix2 or PixD.

Figure 6:
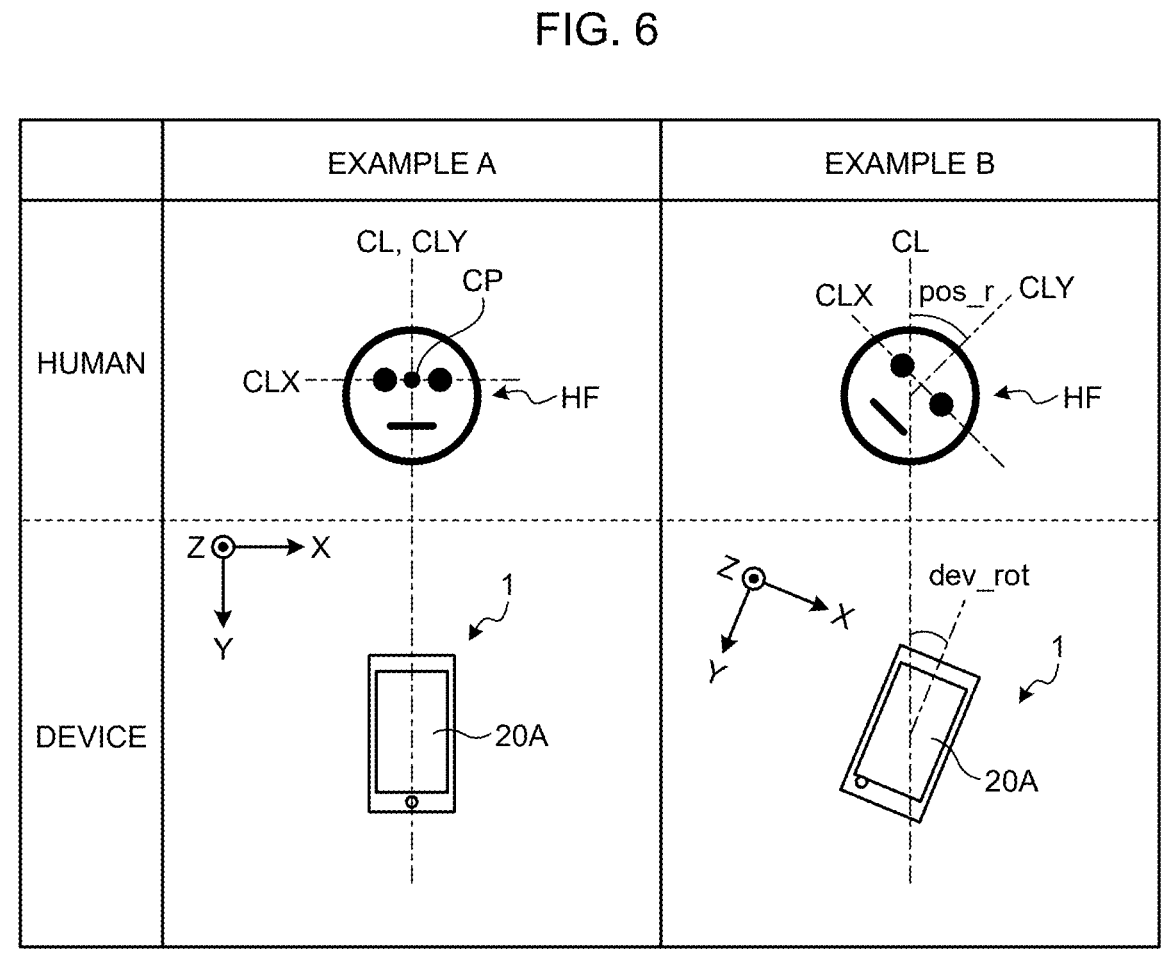
Figure 7:
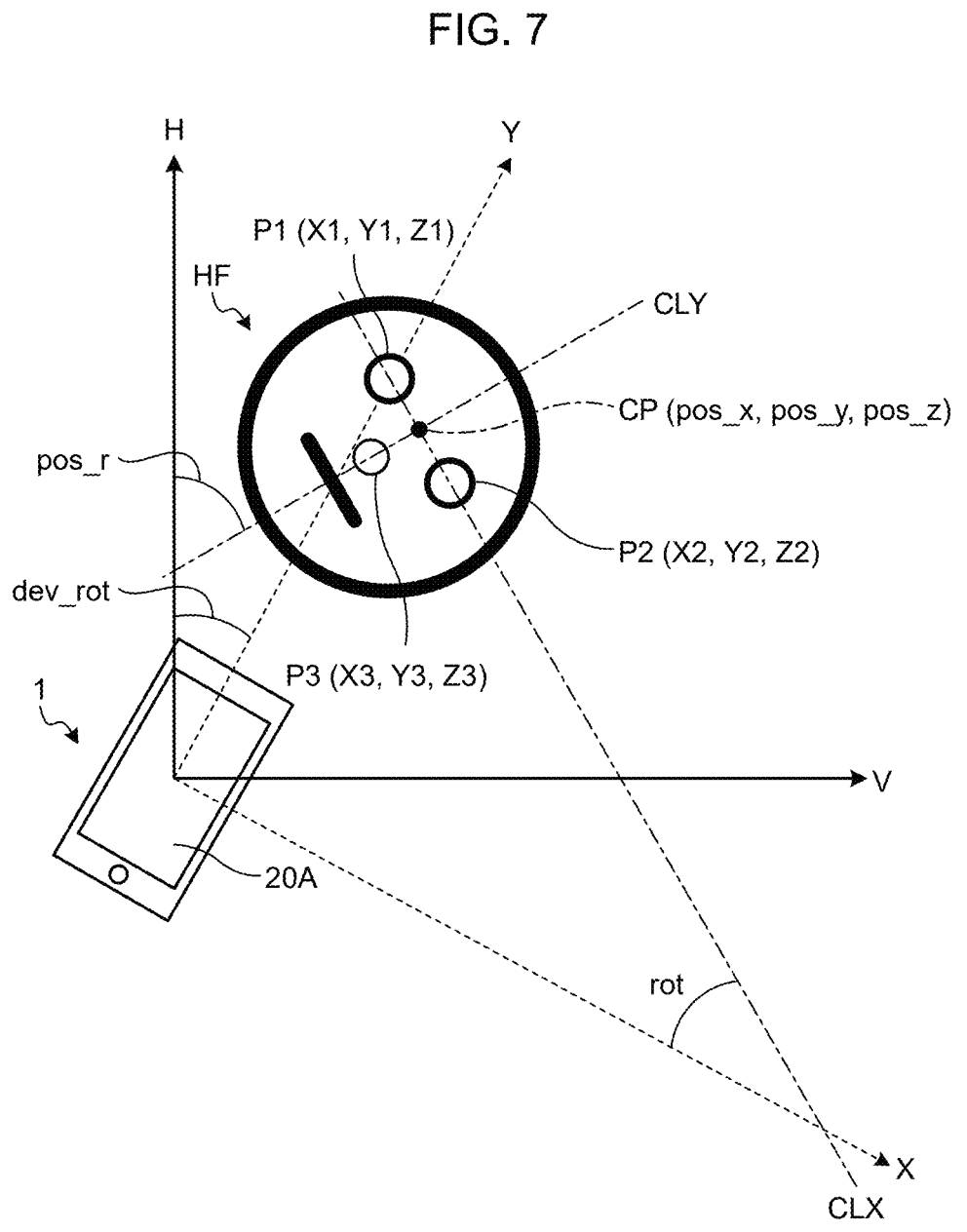

The following describes the relative relation between the arrangement direction of the two eyes of a human and X and Y directions corresponding to disposition of pixels Pix of the display panel 20A with reference to FIGS. 6 and 7.

FIG. 6 is a schematic diagram illustrating Examples A and B of the relative angle relation between a human face HF and the display device 1 including the display panel 20A. The Y direction is assumed to be the longitudinal direction of the quadrilateral shape of the display panel 20A illustrated in FIG. 6 and other diagrams.

In Example A illustrated in FIG. 6, a reference line CLX extending in the arrangement direction of the two eyes of the face HF and passing through the middle point CP is parallel to the X direction of the display panel 20A. Both a midline CLY (refer to "Example B" and FIG. 7) of the face HF and a line bisecting the display panel 20A in the X direction overlap a straight line CL. The Y direction and the straight line CL are parallel to each other. In the case of Example A, as in description with reference to FIGS. 3 and 4, the arrangement direction of the first viewpoint E1 or EC and the second viewpoint E2 or ED aligns with the X direction. Thus, in Example A, the display output control based on description with reference to FIGS. 3 and 4 can be directly applied.

However, in Example B illustrated in FIG. 6, both the midline CLY of the face HF and the line bisecting the display panel 20A in the X direction do not overlap the straight line CL. An angle pos_r of the face HF with respect to the straight line CL and an angle dev_rot of the display panel 20A with respect to the straight line CL are different from each other. The angle pos_r is an angle formed by the midline CLY and the straight line CL. The angle dev_rot is an angle formed by the Y direction and the straight line CL.

In Example A, it can be considered that the angle pos_r and the angle dev_rot are both 0 degrees (°).

FIG. 7 is a schematic diagram illustrating an example of the angle difference between the face HF and the display panel 20A with reference to a vertical line H and a horizontal line V. The vertical line H aligns with the direction of gravity of the Earth. The horizontal line V aligns with a plane orthogonal to the vertical line H. The vertical line H illustrated in FIG. 7 corresponds to the straight line CL in FIG. 6.

The face HF illustrated in FIG. 7 includes points P1, P2, and P3. The point P1 represents the position of the first viewpoint E1 or EC. The point P2 represents the position of the second viewpoint E2 or ED. The point P3 represents a predetermined position (for example, the nose position) overlapping the midline of the face HF. Coordinates representing the positions of the points P1, P2, and P3 are acquired based on image data captured by the image capturer 2 and the distance measurer 3.

As a specific example, the sight line following circuit 11 can identify the X-directional and Y-directional coordinates of the positions of the two eyes and nose of the human face HF by using image processing technologies with OpenCV. The sight line following circuit 11 performs processing of deriving the reference line CLX passing through the points P1 and P2. The sight line following circuit 11 also performs processing of deriving the midline CLY as a straight line orthogonal to the reference line CLX and passing through the point P3. The sight line following circuit 11 determines the middle point between the points P1 and P2 to be the middle point CP and derives the coordinates (pos_x, pos_y, pos_z) of the middle point CP from the coordinates (X1, Y1, Z1) of the point P1 and the coordinates (X2, Y2, Z2) of the point P2. Generally, the middle point CP overlaps the intersection point of the reference line CLX and the midline CLY. The Z-directional coordinates (Z1, Z2, Z3) of the points P1, P2, and P3 are measured by the distance measurer 3. The Z-directional coordinate (pos_z) of the middle point CP is handled as the distance Ph.

The sight line following circuit 11 acquires information (tilt information) indicating the tilt direction of the display panel 20A with respect to the vertical line H and the horizontal line V from a gyro sensor 4 included in the display device 1. The sight line following circuit 11 derives the angle dev_rot based on the tilt information. The sight line following circuit 11 identifies the orientations of the X and Y directions of the display panel 20A with respect to the vertical line H and the horizontal line V based on the relation between the vertical line H, the horizontal line V, and the angle dev_rot.

The sight line following circuit 11 derives a relative angle "rot" formed between the reference line CLX and the X direction. In the following description, when the relative angle "rot" is a positive number, it is meant that the midline CLY of the face HF forms an angle in the clockwise direction with respect to the Y direction of the display panel 20A. When the relative angle "rot" is a negative number, it is meant that the midline CLY of the face HF forms an angle in the anticlockwise direction with respect to the Y direction of the display panel 20A. The relative angle "rot" can be expressed in the range of −180 degrees (°) to 180 degrees (°), for example. The angle pos_r is the summed value of the angle dev_rot and the relative angle "rot".

The image output circuit 12 performs various kinds of processing related to display output control to display the viewpoint correspondence image data OP on the display panel 20A by referring to information indicating the coordinates (pos_x, pos_y, pos_z) of the middle point CP and information indicating the relative angle "rot" (or the angle pos_r and the angle dev_rot) among various kinds of information derived and identified by the sight line following circuit 11. The details thereof will be described below.

Depending on the relative angle "rot", individual image output to a plurality of viewpoints cannot be achieved by applying the control of pixels Pix along the X direction to the first pixels Pix1 or PixC and the second pixels Pix2 or PixD, which is described above with reference to FIGS. 3 and 4. The following describes the relation between the relative angle "rot" and the feasibility of stereoscopic viewing.

Figure 8:
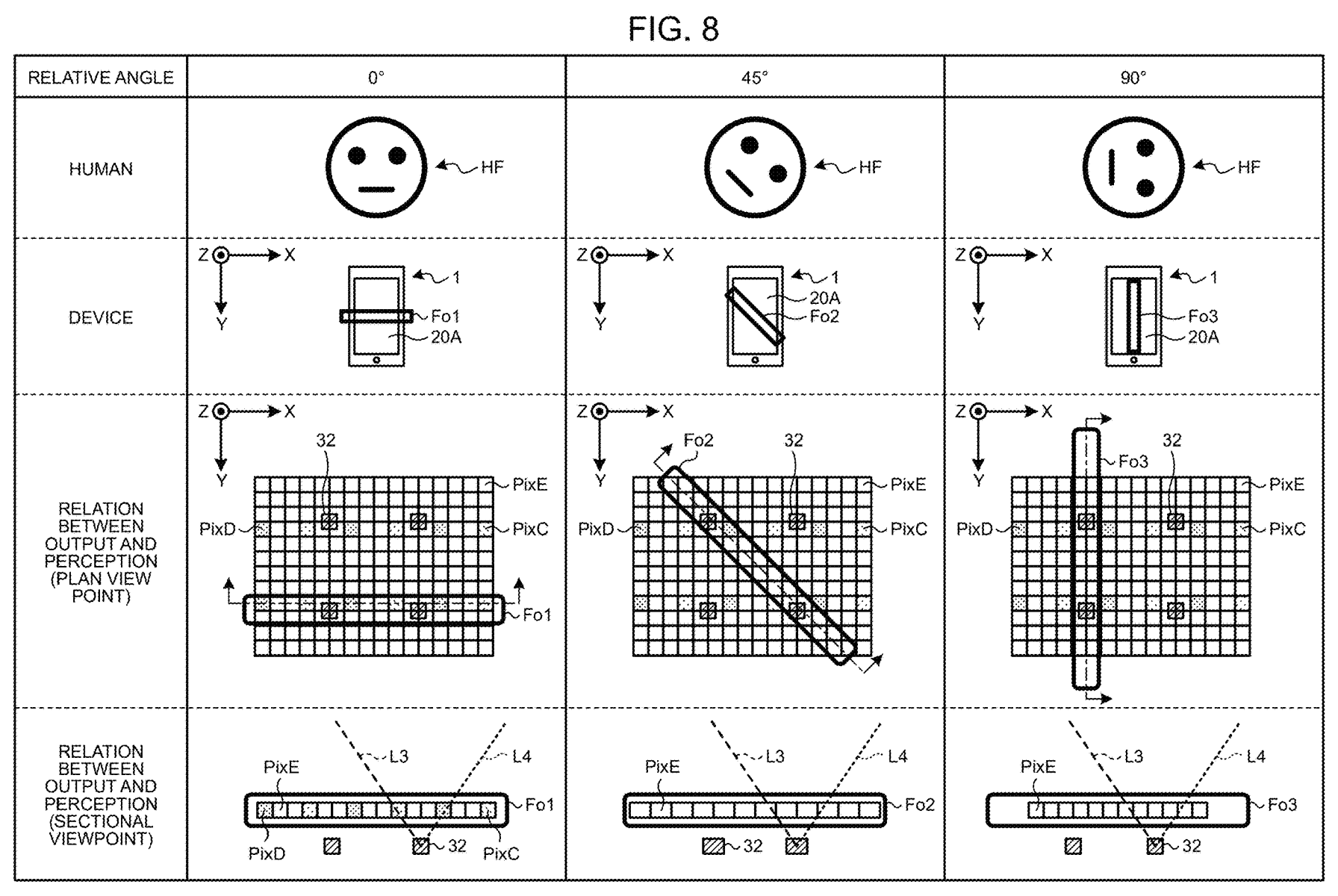

FIG. 8 is a schematic diagram illustrating an example of the relation between the relative angle "rot" and the feasibility of individual image output to a plurality of viewpoints by applying the control of pixels Pix along the X direction to the first pixels PixC and the second pixels PixD, which is described above with reference to FIGS. 3 and 4.

In FIG. 8, the "human" row schematically indicates the orientation of the human face HF relative to the display panel 20A illustrated in the "device" row. In the "device" row, the area of the human's sight line to the display panel 20A of the display device 1 is indicated as any of areas Fo1, Fo2, and Fo3. The "relation between output and perception (plan view point)" row schematically indicates the relation between light emission points 32 and pixels Pix at part of the display panel 20A including any of the areas Fo1, Fo2, and Fo3 illustrated in the "device" row. The "relation between output and perception (sectional viewpoint)" row indicates a section at a position illustrated with a dashed and single-dotted line and arrows in the "relation between output and perception (plan view point)" row.

As schematically illustrated with the area Fo1 in the "relation between output and perception (sectional viewpoint)" row, when the relative angle "rot" is 0 degrees (°), light L3 having passed through the first pixels PixC reaches the first viewpoint EC and light L4 having passed through the second pixels PixD reaches the second viewpoint ED by applying the control of pixels Pix along the X direction to the first pixels PixC and the second pixels PixD, which is described above with reference to FIGS. 3 and 4. Thus, when the relative angle "rot" is 0 degrees (°) it is possible to achieve individual image output to a plurality of viewpoints by applying the control of pixels Pix along the X direction to the first pixels PixC and the second pixels PixD, which is described above with reference to FIGS. 3 and 4.

As schematically illustrated with the area Fo2 in the "relation between output and perception (sectional viewpoint)" row, when the relative angle "rot" is 45 degrees (°), the ray line of light between each first pixel PixC and the first viewpoint EC and the ray line of light between each second pixel PixD and the second viewpoint ED do not hold by simply applying the control of pixels Pix along the X direction to the first pixels PixC and the second pixels PixD, which is described above with reference to FIGS. 3 and 4. Thus, when the relative angle "rot" is 45 degrees (°), it is difficult to achieve individual image output to a plurality of viewpoints by simply applying the control of pixels Pix along the X direction to the first pixels PixC and the second pixels PixD, which is described above with reference to FIGS. 3 and 4. As schematically illustrated with the area Fo3 in the "relation between output and perception (sectional viewpoint)" row, the same as when the relative angle "rot" is 45 degrees (°) is applied to the case when the relative angle "rot" is 90 degrees (°).

Figure 9:
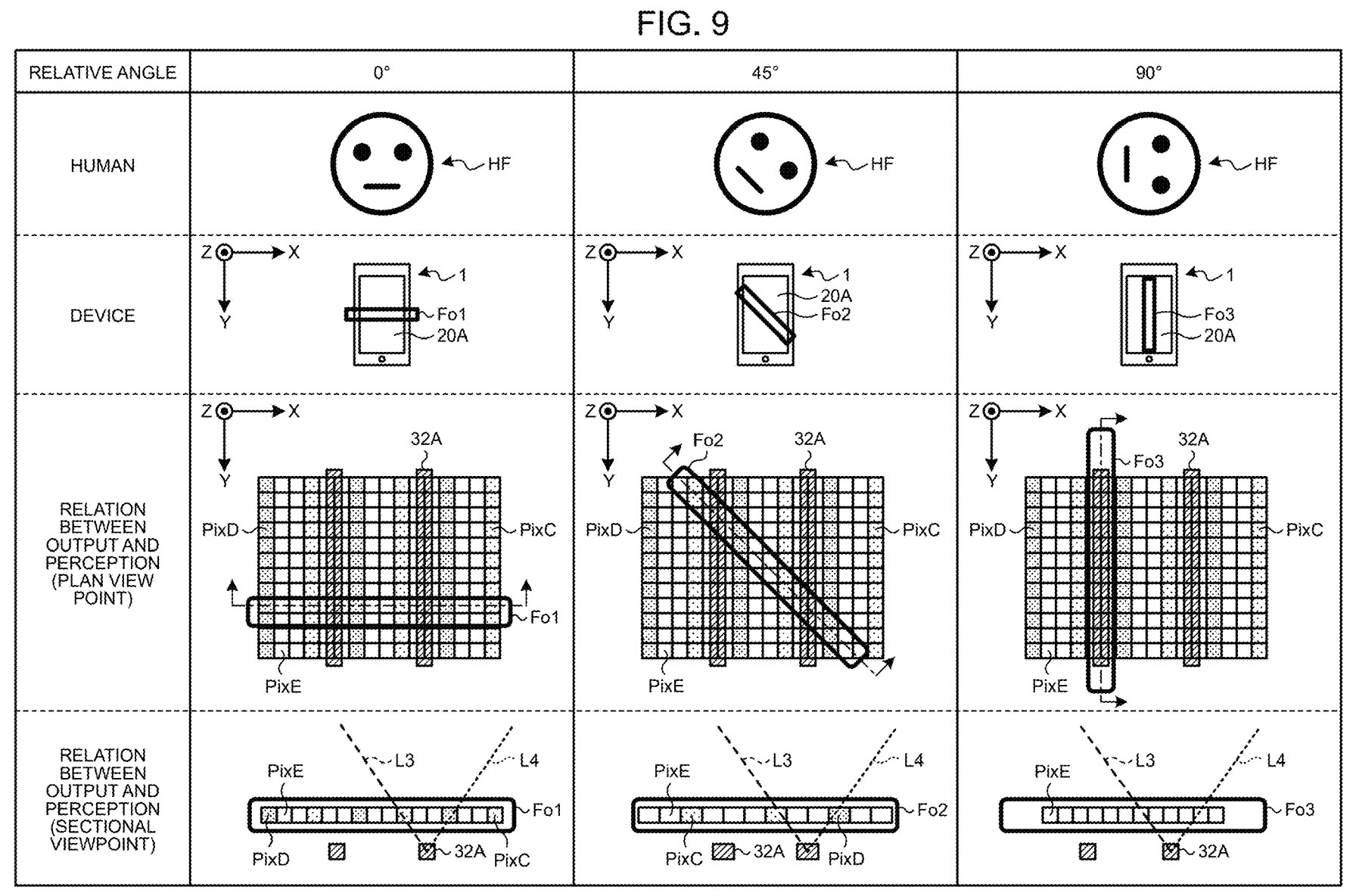

FIG. 9 is a schematic diagram illustrating another example of the relation between the relative angle "rot" and the feasibility of individual image output to a plurality of viewpoints by applying the control of pixels Pix along the X direction to the first pixels PixC and the second pixels PixD, which is described above with reference to FIGS. 3 and 4. In the configuration illustrated in FIG. 9, linear light sources 32A are provided in place of the light emission points 32 described above with reference to FIG. 8. The light emission points 32 illustrated in FIG. 8 are holes or light-emitting elements that function as what is called point light sources. The linear light sources 32A illustrated in FIG. 9 are slits or light-emitting elements that function as linear light sources extending in the Y direction.

Even in a case where the linear light sources 32A are employed in place of the light emission points 32, it is possible to achieve individual image output to a plurality of viewpoints by applying the control of pixels Pix along the X direction to the first pixels PixC and the second pixels PixD, which is described above with reference to FIGS. 3 and 4, when the relative angle "rot" is 0 degrees (°). When the relative angle "rot" is 45 degrees (°) in a case where the linear light sources 32A are employed in place of the light emission points 32, it is possible to achieve individual image output to a plurality of viewpoints by applying the control of pixels Pix along the X direction to the first pixels PixC and the second pixels PixD, which is described above with reference to FIGS. 3 and 4, as illustrated in the "45°" column in FIG. 9, but it is unreliable. When the relative angle "rot" is 90 degrees (°), it is difficult, irrespective of whether the light emission points 32 or the linear light sources 32A are employed, to achieve individual image output to a plurality of viewpoints by simply applying the control of pixels Pix along the X direction to the first pixels PixC and the second pixels PixD, which is described above with reference to FIGS. 3 and 4.

As described above with reference to FIGS. 8 and 9, depending on the relative angle "rot", it may be difficult to achieve individual image output to a plurality of viewpoints by simply applying the control of pixels Pix along the X direction to the first pixels Pix1 or PixC and the second pixels Pix2 or PixD, which is described above with reference to FIGS. 3 and 4. Thus, in the embodiment, processing (relative angle correspondence processing) for more appropriately controlling disposition of the first pixels Pix1 or PixC and the second pixels Pix2 or PixD in accordance with the relative angle "rot" is performed. The following describes an overview of this processing with reference to FIGS. 10 to 12.

Figure 10:
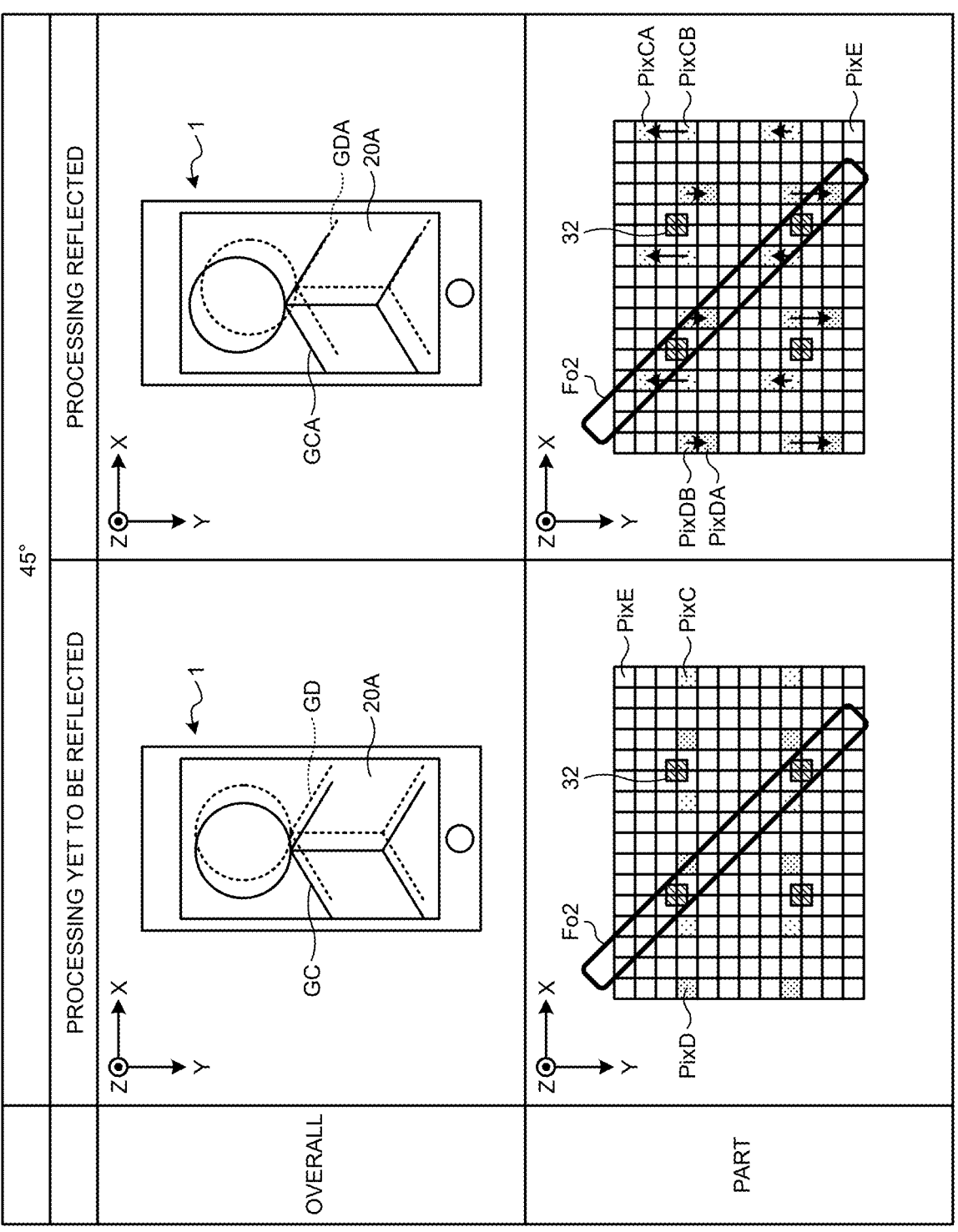
FIG. 10 is a schematic diagram illustrating an example of pixel arrangement control in a case where the relative angle is 45 degrees (°)
Figure 11:
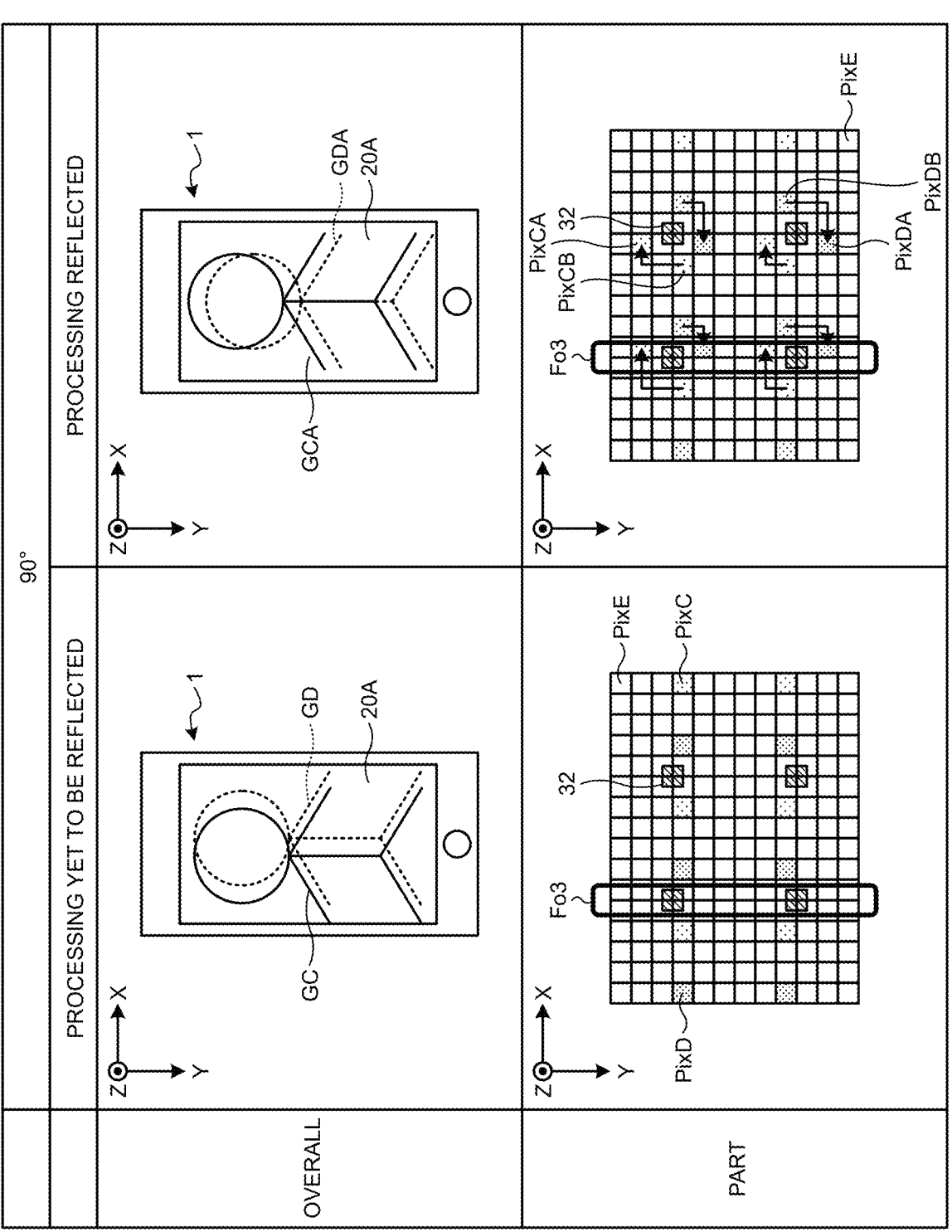
FIG. 11 is a schematic diagram illustrating an example of pixel arrangement control in a case where the relative angle is 90 degrees (°)

FIG. 10 is a schematic diagram illustrating an example of pixel arrangement control when the relative angle "rot" is 45 degrees (°). FIG. 11 is a schematic diagram illustrating an example of pixel arrangement control when the relative angle "rot" is 90 degrees (°). The disposition control of the first pixels PixC and the second pixels PixD in the "processing yet to be reflected" column in FIGS. 10 and 11 is the same as in the "45°" column in FIG. 8. In the embodiment, pixel disposition control in accordance with the relative angle "rot" is performed as illustrated in the "processing reflected" column.

In FIGS. 10 and 11, pixels corresponding to the first pixels PixC in a case where the control of pixels Pix along the X direction is applied to the first pixels Pix1 or PixC and the second pixels Pix2 or PixD, which is described above with reference to FIGS. 3 and 4, are referred to as first pixels PixCB, and pixels corresponding to the second pixels PixD in this case are referred to as first pixels PixDB. Pixels corresponding to the first pixels PixC, which are determined by the relative angle correspondence processing applied in the embodiment are referred to as first pixels PixCA, and pixels corresponding to the second pixels PixD thus determined are referred to as second pixels PixDA.

For example, assume that when the control of pixels Pix along the X direction is reflected to the first pixels Pix1 or PixC and the second pixels Pix2 or PixD, which is described above with reference to FIGS. 3 and 4, a first image GC and a second image GD are output to be arranged in the X direction in the display panel 20A as illustrated in the "overall" row of the "processing yet to be reflected" column in FIGS. 10 and 11. The first image GC is an image viewed with light passing through the first pixels PixC. The second image GD is an image viewed with light passing through the second pixels PixD. When the relative angle "rot" is assumed to be 0 degrees (°), stereoscopic viewing is established with the first image GC and the second image GD illustrated in the "overall" row of the "processing yet to be reflected" column. When the relative angle "rot" is 45 degrees (°) or 90 degrees (°), it is difficult to establish stereoscopic viewing with the first image GC and the second image GD illustrated in the "overall" row of the "processing yet to be reflected" column.

Thus, as illustrated in the "overall" row of the for "processing reflected" column in FIGS. 10 and 11, pixel disposition control in accordance with the relative angle "rot" is performed so that a first image GCA and a second image GDA correspond to the arrangement direction of the two eyes of the face HF in the display panel 20A. The first image GCA is an image viewed with light passing through the first pixels PixCA. The second image GDA is an image viewed with light passing through the second pixels PixDA. As indicated by comparison between the first image GC and the first image GCA and comparison between the second image GD and the second image GDA, the first image GCA is the same image as the first image GC. The second image GDA is the same image as the second image GD. However, the relative position angle relation between the first image GCA and the second image GDA is different from the relative position angle relation between the first image GC and the second image GD. The relative position angle relation between the first image GCA and the second image GDA is displaced to correspond to the arrangement direction of the two eyes of the face HF in accordance with the relative angle "rot". Processing related to disposition control of the first pixels PixCA and the second pixels PixDA is performed so that such a relative position angle relation between the first image GCA and the second image GDA is established.

FIG. 12 is a schematic diagram illustrating an example of the relation between the relative angle "rot" and the feasibility of individual images output to a plurality of viewpoints in a case where the disposition control described above with reference to FIGS. 10 and 11 is reflected. As illustrated in the "45°" column and the "90°" column in FIG. 12, light L3 having passed through the first pixels PixCA reaches the first viewpoint EC and light L4 having passed through the second pixels PixDA reaches the second view-point ED when the disposition control described above with reference to FIGS. 10 and 11 is reflected. Thus, it is possible to achieve individual image output to a plurality of view-points through the disposition control described above with reference to FIGS. 10 and 11.

The description with reference to FIGS. 10 to 12 is made with an example in which the relative angle "rot" is 45 degrees (°) or 90 degrees (°), but in the embodiment, disposition of the first pixels PixCA and the second pixels PixDA relative to light emission points LP such as the light emission points 32 or the linear light sources 32A can be controlled to correspond to the arrangement direction of the two eyes of the face HF, irrespective of the value of the relative angle "rot". Thus, in the embodiment, it is possible to achieve individual image output to a plurality of view-points irrespective of the relative angle "rot" by applying the control of pixels Pix along the X direction to the first pixels PixC and the second pixels PixD, which is described above with reference to FIGS. 3 and 4.

The relative positional relation between a display device such as the display panel 20A and the viewpoints (for example, the first viewpoint E1 and the second viewpoint E2) of a user viewing an image output from the display device may change after an image to be output from the display device is determined. The display device of the embodiment changes display output in accordance with such change of the relative positional relation. The following describes change in a direction along the X-Y plane in such change of the relative positional relation with reference to FIGS. 13 and 14. The following also describes change in the Z direction in the change of the relative positional relation with reference to FIGS. 15 and 16.

Figure 13:
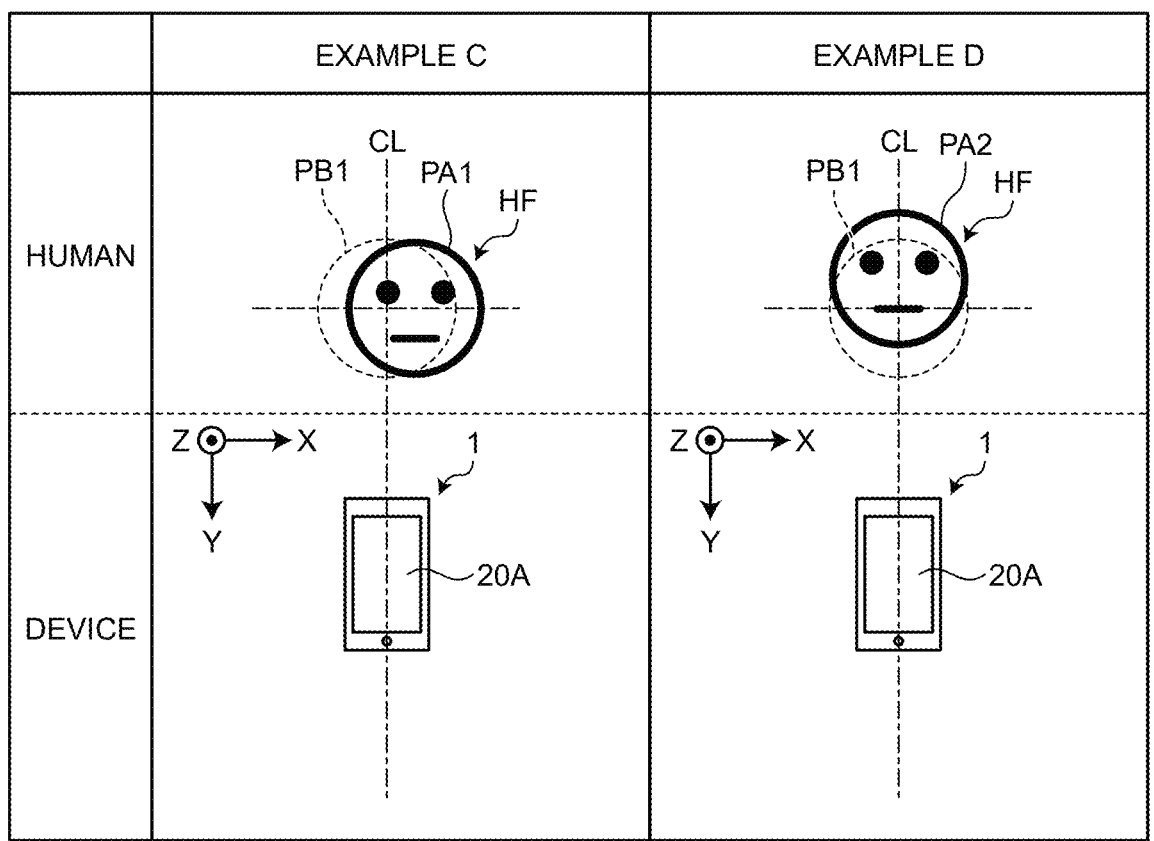
FIG. 13 is a schematic view illustrating an example of change patterns of the relative positional relation between a display panel 20A and a face HF.
Figure 14:
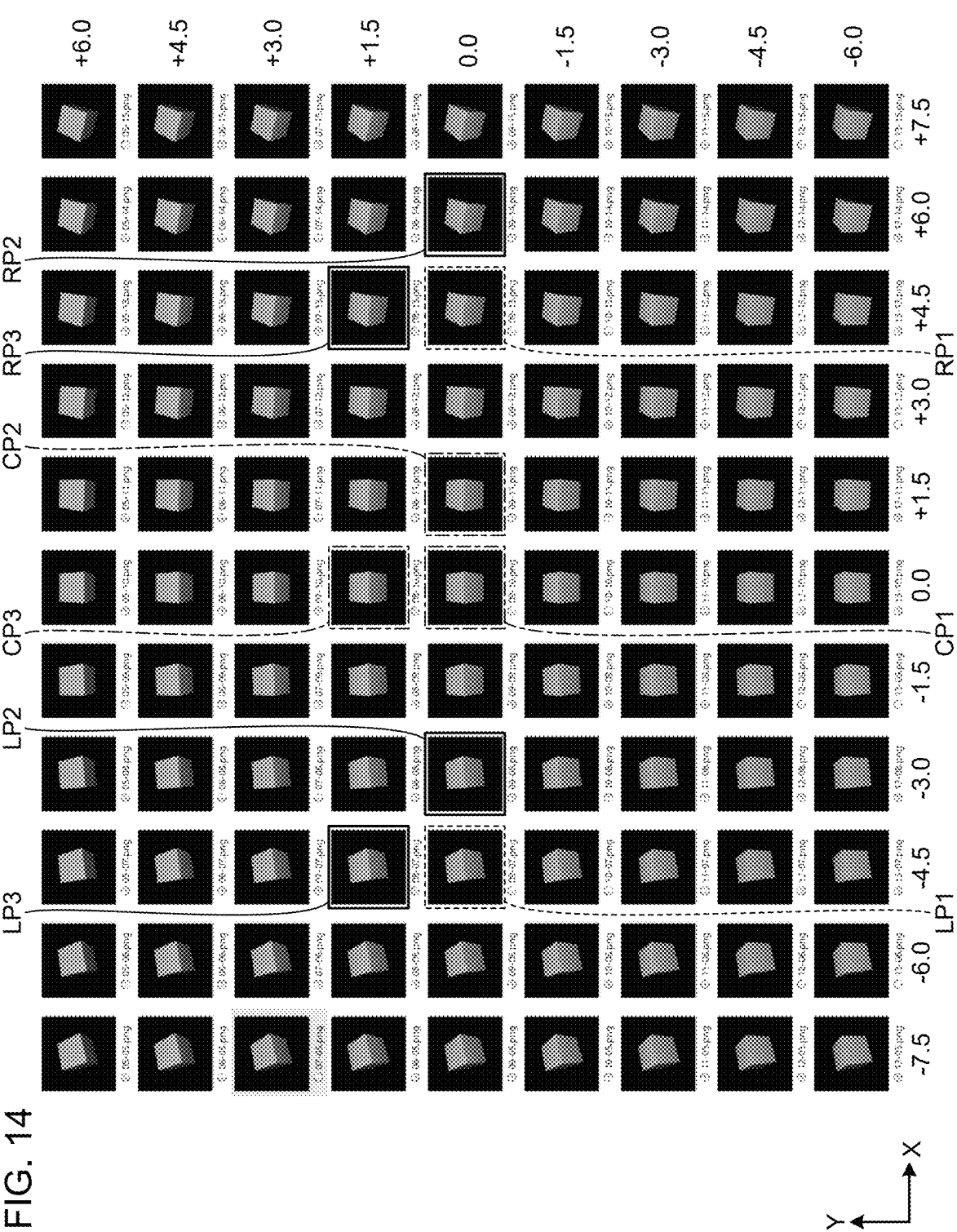
FIG. 14 is a diagram illustrating an example of change patterns of display output corresponding to the relative positional relation change illustrated in FIG. 13.

FIG. 13 is a schematic view illustrating an example of change patterns of the relative positional relation between the display panel 20A and the face HF. FIG. 14 is a diagram illustrating an example of change patterns of display output corresponding to the relative positional relation change illustrated in FIG. 13.

For example, assume that the position of the face HF before change of the relative positional relation between the display panel 20A and the face HF is a position PB1 illustrated in FIG. 13. In this assumption, the position of the middle point CP (refer to FIG. 3 and the other diagrams) corresponds to the position of the center image data CP1 illustrated in FIG. 14, image data selected for an image to be output to the first viewpoint E1 is image data LP1 illustrated in FIG. 14, and image data selected for an image to be output to the second viewpoint E2 is image data LP2 illustrated in FIG. 14.

Assume that the position of the face HF has moved to the one side in the X direction as illustrated in "Example C" in FIG. 13. Specifically, assume that the position of the face HF has changed from the position PB1 illustrated in FIG. 13 to a position PA1. Also assume that, by this positional relation change, the position of the middle point CP has changed from the position corresponding to the center image data CP1 illustrated in FIG. 14 to the position corresponding to image data CP2. The coordinates of the image data CP2 are located on the one side in the X direction relative to the coordinates of the center image data CP1. In this case, the display output of the display panel 20A are changed in accordance with change of the relative positional relation between the display panel 20A and the face HF. Specifically, image data selected for an image to be output to the first viewpoint E1 is changed from the image data LP1 to the image data LP2 illustrated in FIG. 14, and image data selected for an image to be output to the second viewpoint E2 is changed from image data RP1 to image data RP2 illustrated in FIG. 14. The coordinates of the image data LP2 are located on the one side in the X direction relative to the coordinates of the image data LP1. The coordinates of the image data RP2 are located on the one side in the X direction relative to the coordinates of the image data RP1.

Alternatively, assume that the position of the face HF has moved to the one side in the Y direction as illustrated in "Example D" in FIG. 13. Specifically, assume that the position of the face HF has changed from the position PB1 to a position PA2 illustrated in FIG. 13. Also assume that, through this positional relation change, the position of the middle point CP has changed from the position correspond-ing to the center image data CP1 illustrated in FIG. 14 to the position corresponding to image data CP3. The coordinates of the image data CP3 are located on the one side in the Y direction relative to the coordinates of the center image data CP1. In this case, the display output of the display panel 20A are changed in accordance with change of the relative positional relation between the display panel 20A and the face HF. Specifically, image data selected for an image to be output to the first viewpoint E1 is changed from the image data LP1 to image data LP3 illustrated in FIG. 14, and image data selected for an image to be output to the second viewpoint E2 is changed from the image data RP1 to image data RP3 illustrated in FIG. 14. The coordinates of the image data LP3 are located on the one side in the Y direction relative to the coordinates of the image data LP1. The coordinates of the image data RP3 are located on the one side in the Y direction relative to the coordinates of the image data RP1.

Figure 15:
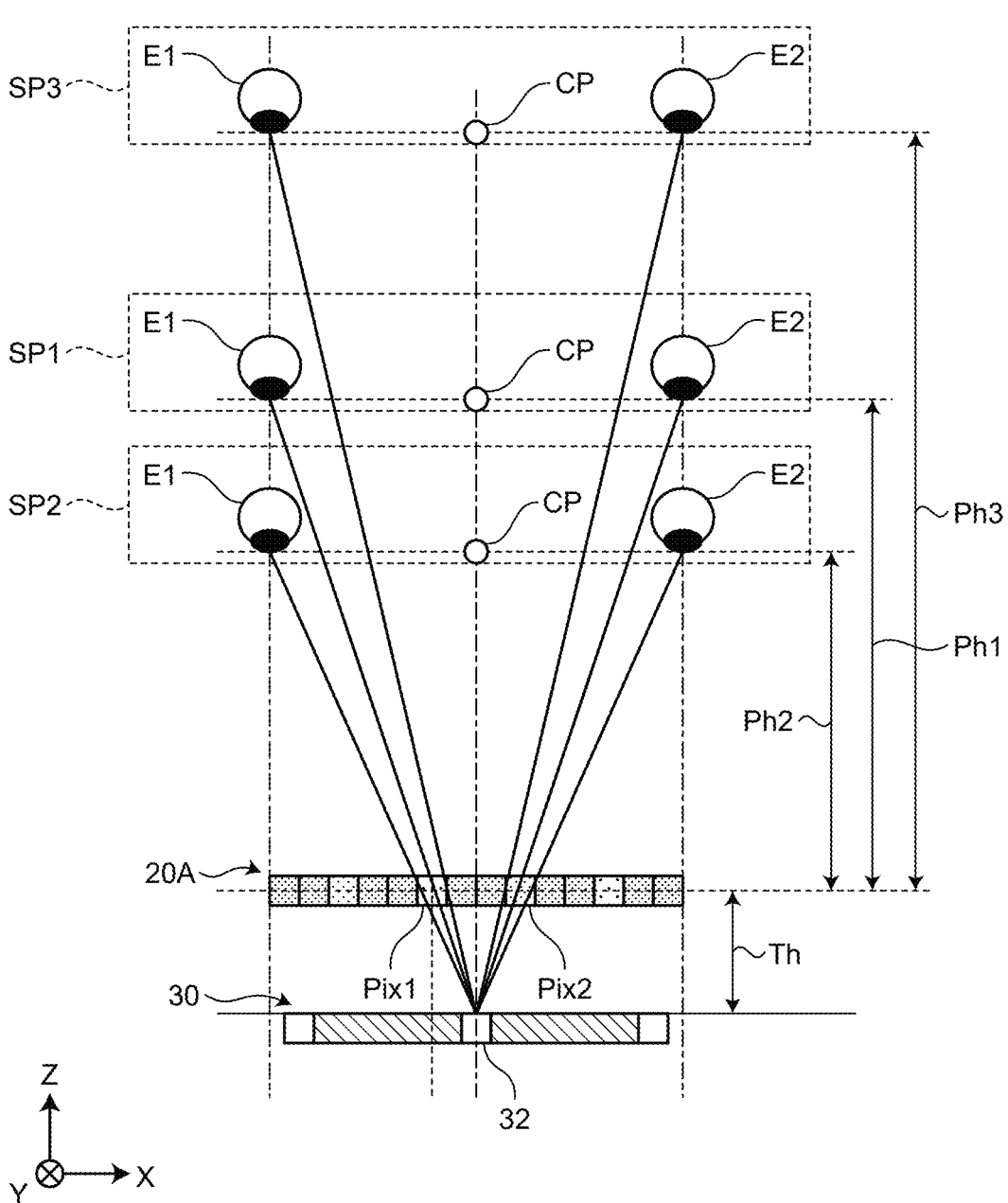
FIG. 15 is a schematic view illustrating an example of change patterns of the relative positional relation between the display panel 20A and the face HF.

FIG. 15 is a schematic view illustrating an example of change patterns of the relative positional relation between the display panel 20A and the face HF. FIG. 16 is a diagram illustrating an example of change patterns of display output corresponding to the relative positional relation change illustrated in FIG. 15.

For example, assume that the positions of the first view-point E1, the second viewpoint E2, and the middle point CP relative to the display panel 20 before change of the relative positional relation of the first viewpoint E1, the second viewpoint E2, and the middle point CP to the display panel 20A are a position SP1 illustrated in FIG. 15. In this assumption, the position of the middle point CP corresponds to the position of the center image data CP1 illustrated in FIG. 16, image data selected as an image to be output to the first viewpoint E1 is the image data LP1 illustrated in FIG. 16, and image data selected as an image to be output to the second viewpoint E2 is the image data LP2 illustrated in FIG. 16. The distance from the first viewpoint E1, the second viewpoint E2, and the middle point CP to the Z-directional center line of the display panel 20 at this point is referred to as a distance Ph1.

Then assume that the relative positional relation between the display panel 20A and the face HF has changed so that the face HF further moves closer to the display panel 20A. Specifically, assume that the positions of the first viewpoint E1, the second viewpoint E2, and the middle point CP have moved from the position SP1 to a position SP2 in FIG. 15. The distance from the first viewpoint E1, the second view-point E2, and the middle point CP to the Z-directional center line of the display panel 20 when the face HF is located at the position SP2 is referred to as a distance Ph2. The distance Ph2 is shorter than the distance Ph1. In this case, the display output of the display panel 20A are changed in accordance with change of the relative positional relation between the display panel 20A and the face HF. Specifically, image data selected for an image to be output to the first viewpoint E1 is changed from the image data LP1 to image data LP5 illustrated in FIG. 16, and image data selected for an image to be output to the second viewpoint E2 is changed from the image data RP1 to image data RP5 illustrated in FIG. 16. The coordinates of image data LP5 are located on the other side in the X direction relative to the coordinates of the image data LP1. The coordinates of image data RP5 are located on the one side in the X direction relative to the coordinates of the image data RP1.

Alternatively, assume that the relative positional relation between the display panel 20A and the face HF has changed so that the face HF moves farther away from the display panel 20A. Specifically, assume that the positions of the first viewpoint E1, the second viewpoint E2, and the middle point CP have moved from the position SP1 to a position SP3 in FIG. 15. The distance from the first viewpoint E1, the second viewpoint E2, and the middle point CP to the Z-directional center line of the display panel 20 when the face HF is located at the position SP3 is referred to as the distance Ph3. A distance Ph3 is longer than the distance Ph1. In this case, the display output of the display panel 20A are changed in accordance with change of the relative positional relation between the display panel 20A and the face HF. Specifically, image data selected for an image to be output to the first viewpoint E1 is changed from the image data LP1 to the image data LP4 illustrated in FIG. 16, and image data selected for an image to be output to the second viewpoint E2 is changed from the image data RP1 to the image data RP4 illustrated in FIG. 16. The coordinates of the image data LP4 are located on the one side in the X direction relative to the coordinates of the image data LP1. The coordinates of the image data RP4 are located on the other side in the X direction relative to the coordinates of the image data RP1.

In the embodiment, when the distance between the display panel 20A and the user is relatively long, image data at coordinates closer to the center image data CP1 is selected as compared to a case where the distance between the display panel 20A and the user is relatively short, as described above with the relation between the image data LP1 and the image data LP5 and the relation between image data RP1 and the image data RP5, and the relation between the image data LP1 and the image data LP4 and the relation between the image data RP1 and the image data RP4.

Specific processing related to display output change described above with reference to FIGS. 13 to 16 is performed by the signal processor 10. The signal processor 10 of the embodiment further has a function in which, when image data for the positions of the first viewpoint E1 and the second viewpoint E2 detected by the sight line following circuit 11 is not included in the viewpoint correspondence image data OP, the image generator 12b generates image data in an interpolated manner and performs its display-output on the display panel 20. This function is implemented by the image generator 12b.

The image output circuit 12b controls the image generator 12b to generate image data when image data is not stored in the storage 12a corresponding to the positional relation between an image display surface such as the image display surface 200 (refer to FIG. 3) in a display panel such as the display panel 20A and the user's viewpoints (for example, the first viewpoint E1 and the second viewpoint E2). In the embodiment, the "when image data is not stored in the storage corresponding to the positional relation between the image display surface of the display panel and the user's viewpoints" means a case where image data corresponding to the positions of the first viewpoint E1 and the second viewpoint E2 detected by the sight line following circuit 11 is not included in the viewpoint correspondence image data OP. The image generator 12b generates image data corresponding to the positional relation between the image display surface of the display panel and the user's viewpoints in an interpolated manner from two pieces of image data close to the positional relation. Processing related to such interpolated image data generation is referred to as image data interpolation processing. The image output circuit 12 selects image data generated by the image generator 12b in such a case. The following describes the function implemented by the image generator 12b in the embodiment with reference to FIGS. 17 to 24.

Figure 17:
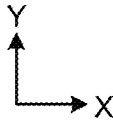
FIG. 17 is a schematic view illustrating an example of change patterns of selected image data along with change of the relative rotation angle between the display panel 20A and viewpoints EL and ER.

FIG. 17 is a schematic view illustrating an example of change patterns of selected image data along with change of the relative rotation angle between the display panel 20A and the viewpoints EL and ER. For example, as an initial condition, assume that the position of the middle point CP (refer to FIG. 5) between the viewpoints EL and ER overlaps the image data CP2 illustrated in FIG. 17 and the viewpoints EL and ER are aligned along the X direction. Also assume that, under the initial condition, image data L_00 illustrated in FIG. 17 is selected as image data for the viewpoint EL, and image data R 00 illustrated in FIG. 17 is selected as image data for the viewpoint ER. In this case, when the relative rotation angle between the display panel 20A and the user's face is changed and the viewpoints EL and ER are rotated in the clockwise direction about the image data CP2 with respect to the display panel 20A, the image data to be selected for the viewpoints EL and ER is image data of images corresponding to the rotation about the image data CP2. Hereinafter, assuming that, with reference to the initial condition, the viewpoints EL and ER are rotated by Q degrees in the clockwise direction about the image data CP2 with respect to the display panel 20A, description will be made depending on the value of Q.

In the case of Q=15, image data L_15 illustrated in FIG. 17 is selected as image data for the viewpoint EL, and image data R 15 illustrated in FIG. 17 is selected as image data for the viewpoint ER. In the case of Q=45, image data L_45 illustrated in FIG. 17 is selected as image data for the viewpoint EL, and image data R 30 illustrated in FIG. 17 is selected as image data for the viewpoint ER. In the case of Q=75, image data L_75 illustrated in FIG. 17 is selected as image data for the viewpoint EL, and image data R_75 illustrated in FIG. 17 is selected as image data for the viewpoint ER. In the case of Q=90, image data L_90 illustrated in FIG. 17 is selected as image data for the viewpoint EL, and image data R_90 illustrated in FIG. 17 is selected as image data for the viewpoint ER.

In FIG. 17, the XY coordinates of the image data L_00 are (−4.5, 0.0). The XY coordinates of the image data L_15 are (−4.5, +1.5). The XY coordinates of the image data L_45 are (−3.0, +3.0). The XY coordinates of the image data L_75 are (−1.5, +4.5). The XY coordinates of the image data L_90 are (0.0, +4.5). The XY coordinates of the image data R 00 are (+4.5, 0.0). The XY coordinates of the image data R 15 are (+4.5, −1.5). The XY coordinates of the image data R 45 are (+3.0, −3.0). The XY coordinates of the image data R_75 are (+1.5, −4.5). The XY coordinates of the image data R_90 are (0.0, −4.5).

However, there may occur Q values, such as Q=30 and Q=60, to which no image data included in the viewpoint correspondence image data OP directly corresponds. When no image data corresponding to the value of Q is included in the viewpoint correspondence image data OP in this manner, the image generator 12*b* of the embodiment generates image data corresponding to Q in an interpolated manner based on two pieces of image data corresponding to values close to Q.

Figure 18:
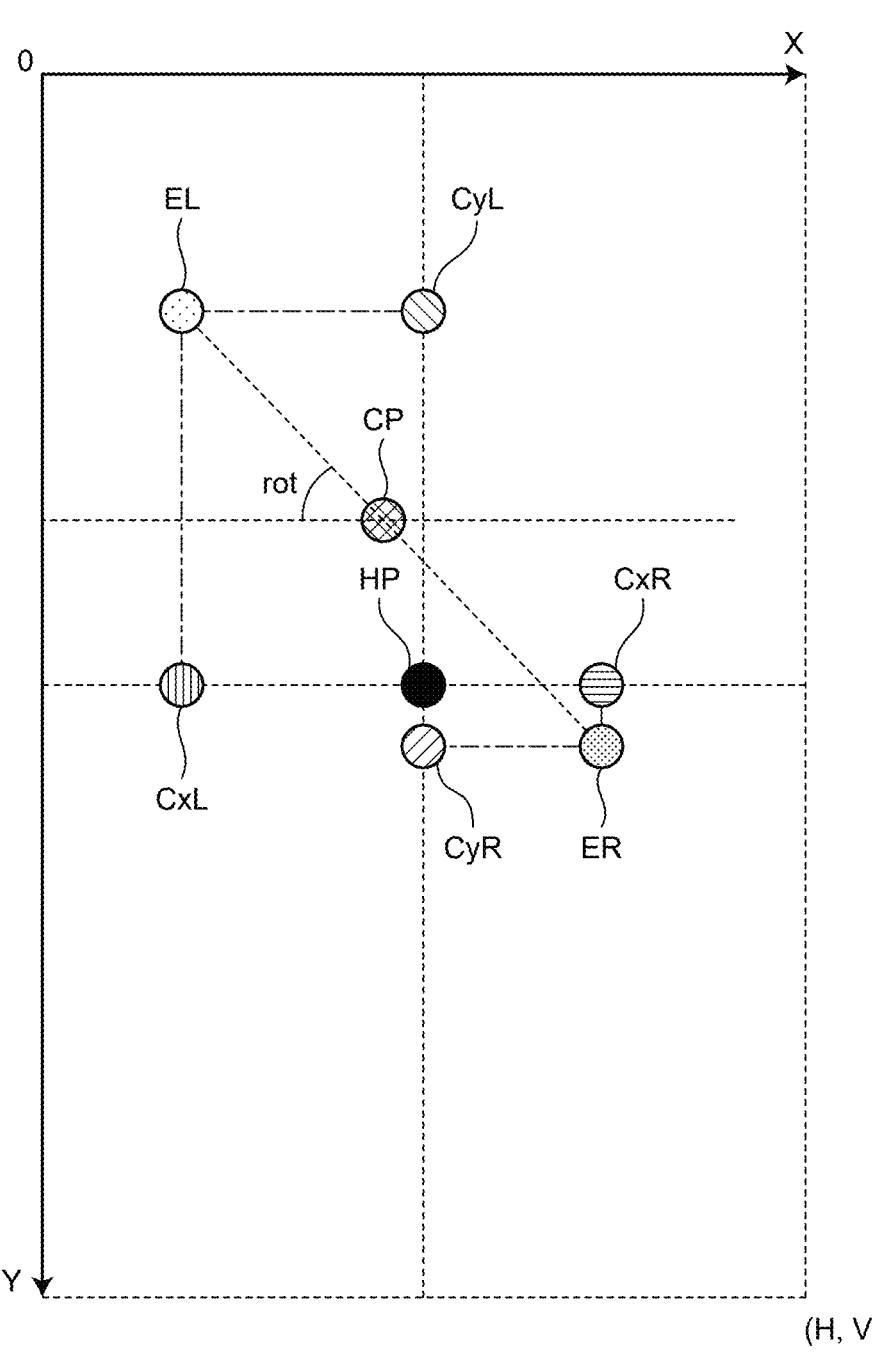
FIG. 18 is an explanatory diagram of parameters related to interpolated image data generation, at a plan view point.

FIG. 18 is an explanatory diagram of parameters related to interpolated image data generation at the plan view point. In the following description with the coordinate system of the display panel 20A, it is assumed that the shape of the display panel 20A at the plan view point is quadrilateral and one (upper-left in FIG. 18) of the four apexes of the quadrilateral is the origin (x, y)=(0, 0) of the coordinate system. It is also assumed that the coordinates of the opposite side (lower-right in FIG. 18) to the origin in the diagonal line direction of the quadrilateral are (H, V). The center point HP illustrated in FIG. 18 is the center point of the display panel 20A in the X and Y directions. Assume that the coordinates of the center point HP are (H/2, V/2).

Assume that the coordinates of the middle point CP are (pos_x, pos_y, pos_h), the coordinates of the viewpoint EL are (posL_x, posL_y, posL_h), and the coordinates of the viewpoint ER are (posR_x, posR_y, posR_h). Also assume that (pos_x, pos_y, pos_h) are known but the coordinates of the viewpoint EL and the coordinates of the viewpoint ER are unknown. Specifically, this assumption is applied when data output from the sight line following circuit 11 indicates (pos_x, pos_y, pos_h) as the coordinates of the middle point CP only and does not individually indicate the coordinates of the viewpoints EL and ER. First, s parameters related to the viewpoint EL will be described below.

The values of posL_x, posL_y, and posL_h included in the coordinates (posL_x, posL_y, posL_h) of the viewpoint EL are calculated as in Expressions (9), (10), and (11) below, respectively. In Expressions (9), (10), and (11), D1 represents the distance D1 described above with reference to FIG. 3. In Expressions (9), (10), and (11), "rot" represents the relative angle "rot" described above with reference to FIG. 7.

$$posL\_x = pos\_x - D1 \times \cos(rot) \qquad (9)$$

$$posL\_y = pos\_y - D1 \times \sin(rot) \qquad (10)$$

$$poxL\_h = pos\_h \qquad (11)$$

Figure 19:
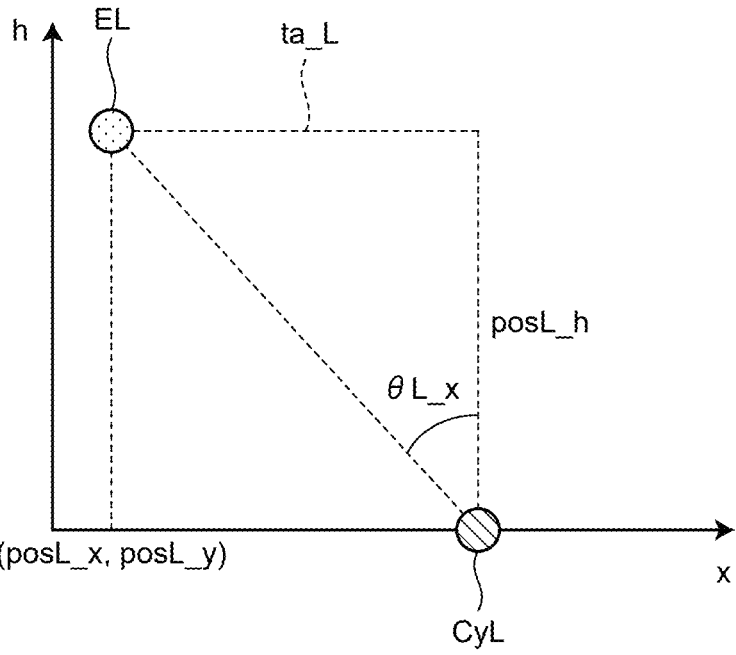
FIG. 19 is an explanatory diagram from a lateral viewpoint, including height-direction parameters related to interpolated image data generation.

FIG. 19 is an explanatory diagram from a lateral viewpoint, including height-direction parameters related to interpolated image data generation. The X- and Y-directional coordinates of a point CxL illustrated in FIGS. 18 and 19 can be expressed as (posL_x, V/2). The X- and Y-directional coordinates of a point CyL illustrated in FIG. 18 can be expressed as (H/2, posL_y). The X-directional linear length of a tangent ta L illustrated in FIG. 19 can be calculated from the X-directional coordinate of the viewpoint EL and the X-directional coordinate of the point CyL and can be expressed as Expression (12) below.

$$ta\_L = posL\_x - H/2 \qquad (12)$$

The tangent ta L illustrated in FIG. 19 corresponds to the tangent (tan) in trigonometric functions for an angle θL_x illustrated in FIG. 19. The angle θL_x is the angle between a vertical line and a straight line connecting the viewpoint EL and the point CyL. The vertical line is a straight line connecting, along the Z direction, the image display surface

200 and a point where an angle is formed (in this case, the point CyL) and is illustrated with a dashed line denoted by reference sign "pos_h" in FIG. 19. Thus, Expression (13) below is satisfied.

$$\tan(\theta L\_x) = (posL\_x - H/2)/posL\_h \qquad (13)$$

From Expression (13), Expression (14) below is satisfied. In Expression (14) and Expression (15) to be described later, arcTan represents the inverse trigonometric function of tangent (tan).

$$\theta L\_x = arcTan((posL\_x - H/2)/posLL\_h) \qquad (14)$$

Although not illustrated, the Y-directional linear length between the Y-directional coordinate of the viewpoint EL and the Y-directional coordinate of the point CyL is referred to as ta_L2. The angle between the vertical line and a straight line connecting the viewpoint EL and a point CL_x (refer to FIG. 18) is referred to as an angle θL_y. In this case, the relation between ta_L2 and θL_y is the same as the above-described relation between the tangent ta L and the angle θL_x. Thus, Expression (15) below is satisfied.

$$\theta L\_y = arcTan((posL\_y - V/2)/posL\_h) \qquad (15)$$

The unit angle of the viewpoint correspondence image data OP described above with reference to FIG. 2 is referred to as the angle Dltθ. In the example illustrated in FIG. 2, Dltθ is 1.5 as described above. A value imgNLx and a value imgNLy can be defined as described below by Expressions (16) and (17) with reference to Dltθ. In Expressions (16) and (17), int{ } (integer type) represents truncation of the decimal fraction of a value obtained as a result of calculation inside { }.

$$imgNLx = int\{\theta L\_x/(Dlt\theta/2)\}/2 \qquad (16)$$

$$imgNLy = int\{\theta L\_y/(Dlt\theta/2)\}/2 \qquad (17)$$

As an example, imgNLx=4.5 and imgNLy=−3 are obtained in the case of θL_x=7.4°, θL_y=−5.1°, and Dltθ=1.5°.

With the combination of the value imgNLx and the value imgNLy, it is possible to identify two pieces of image data selected in accordance with the coordinates of the viewpoint EL and the relative angle "rot" and referenced in image data interpolation processing. The following describes the concept for selecting two pieces of image data referenced in image data interpolation processing with reference to FIGS. 20 to 22.

Figure 20:
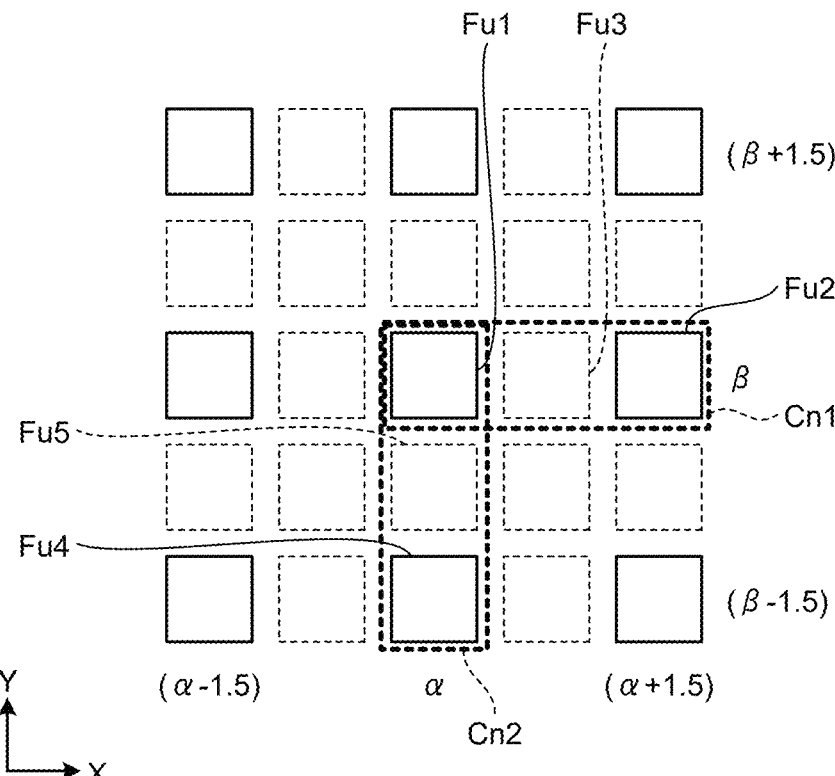
FIG. 20 is a schematic view illustrating an example of interpolation processing that references two pieces of image data aligned next to each other in the X direction and interpolation processing that references two pieces of image data aligned next to each other in a Y direction.
Figures 21, 22:
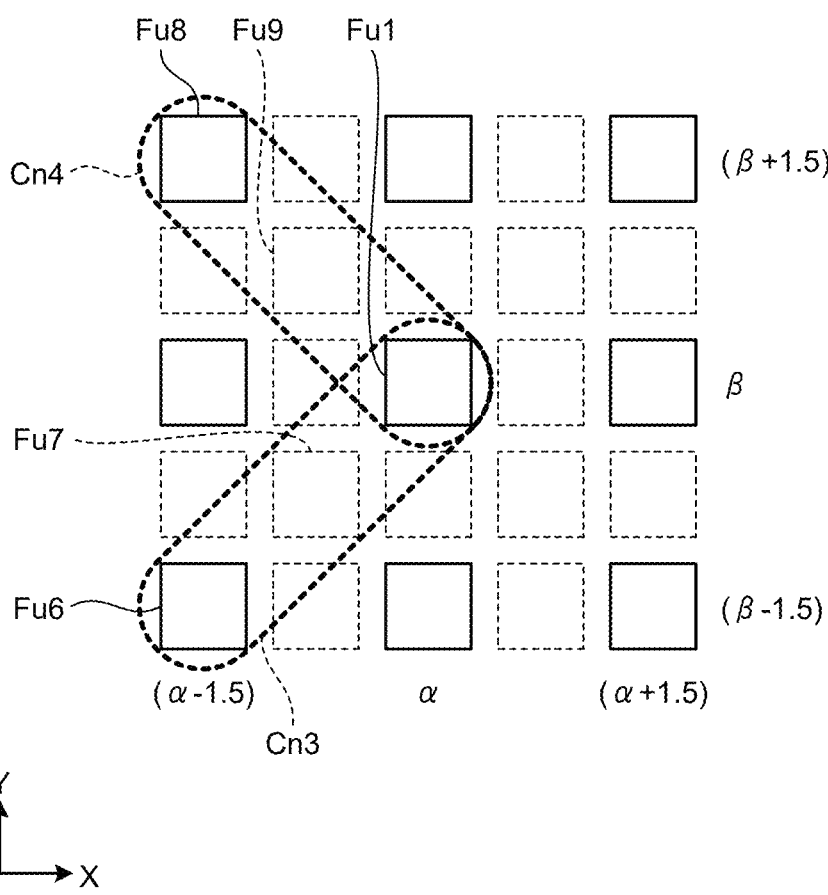
FIG. 21 is a schematic view illustrating an example of interpolation processing that references two pieces of image data aligned next to each other in an oblique direction intersecting the X and Y directions.
FIG. 22 is a diagram illustrating the relation between a relative angle "rot" and a midline CLY of the face HF relative to the Y direction of the display panel 20A.

FIG. 20 is a schematic view illustrating an example of interpolation processing that references two pieces of image data aligned next to each other in the X direction and interpolation processing that references two pieces of image data aligned next to each other in the Y direction. In FIG. 20 and FIG. 21 to be described later, the XY coordinates of image data Fu1 that is one of two pieces of image data referenced in interpolation processing are (α, β). Quadrilaterals illustrated with solid lines in FIGS. 20 and 21 represent some pieces of image data included in the viewpoint correspondence image data OP. Quadrilaterals illustrated with dashed lines in FIGS. 20 and 21 represent image data that can be generated in the interpolation processing. In FIGS. 20 and 21, the XY coordinates of points other than ($\alpha$, $\beta$) are indicated by positive and negative ($\pm$) values relative to $\alpha$ and $\beta$.

For example, when the two pieces of image data referenced in the interpolation processing are the image data Fu1 and image data Fu2 (refer to FIG. 20) aligned next to each other on the one side in the X direction relative to the image data Fu1, image data Fu3 is generated by the interpolation processing. The image data Fu3 is regarded as image data between the image data Fu1 and the image data Fu2. When the two pieces of image data referenced in the interpolation processing are the image data Fu1 and image data Fu4 (refer to FIG. 20) aligned next to each other on the one side in the Y direction relative to the image data Fu1, image data Fu5 is generated by the interpolation processing. The image data Fu5 is regarded as image data between the image data Fu1 and the image data Fu4.

FIG. 21 is a schematic view illustrating an example of interpolation processing that references two pieces of image data aligned next to each other in an oblique direction intersecting the X and Y directions. When the two pieces of image data referenced in the interpolation processing are the image data Fu1 and image data Fu6 (refer to FIG. 21), image data Fu7 is generated by the interpolation processing. The image data Fu7 is regarded as image data between the image data Fu1 and the image data Fu6. When the two pieces of image data referenced in the interpolation processing are the image data Fu1 and image data Fu8 (refer to FIG. 21), image data Fu9 is generated by the interpolation processing. The image data Fu9 is regarded as image data between the image data Fu1 and the image data Fu8.

The value of the value imgNLx is applied to a. The value of the value imgNLy is applied to B. Whether two pieces of image data referenced in interpolation processing are aligned next to each other in the X direction, the Y direction, or the oblique direction depends on the combination of the value imgNLx and the value imgNLy calculated by Expressions (16) and (17) described above.

The following first describes a case where the first decimal place value of the value imgNLx is 5 and the first decimal place value of the value imgNLy is 0. In this case, two pieces of image data aligned next to each other in the X direction are referenced in interpolation processing. As described above, the XY coordinates ($\alpha$, $\beta$) of the image data Fu1 are $\alpha$=imgNLx and $\beta$=imgNLy. One of the referenced two pieces of image data is the image data Fu1 at ($\alpha$, $\beta$) identified in this manner, but whether image data on the one side or the other side in the X direction relative to the image data Fu1 is referenced as the second image data in this case depends on the value imgNLx.

When the value imgNLx is a positive value, the second image data is located at ($\alpha$+1.5, $\beta$). Specifically, in this case, for the image data Fu1 at ($\alpha$, $\beta$) as the first image data, the second image data is the image data Fu2 aligned next to each other on the one side in the X direction relative to the image data Fu1. When the value imgNLx is a negative value, the second image data is located at ($\alpha$−1.5, $\beta$). Specifically, in this case, while the image data Fu1 at ($\alpha$, $\beta$) is the first image data, the second image data is image data located on the other side in the X direction relative to the image data Fu1. The image data located on the other side is image data at a position line symmetric to the image data Fu2 with respect to the image data Fu1 in the X direction.

When the value imgNLx is zero, the same processing as in a case where the value imgNLx is a positive value may be performed or the same processing as in a case where the value imgNLx is a negative value may be performed. In the embodiment, when the value imgNLx is zero, the same processing as in a case where the value imgNLx is a positive value is performed.

The following describes a case where the first decimal place value of the value imgNLx is 0 and the first decimal place value of the value imgNLy is 5. In this case, two pieces of image data aligned next to each other in the Y direction are referenced in interpolation processing. As described above, the XY coordinates ($\alpha$, $\beta$) of the image data Fu1 are $\alpha$=imgNLx and $\beta$=imgNLy. One of the referenced two pieces of image data is the image data Fu1 at ($\alpha$, $\beta$) identified in this manner, but whether image data on the one side or the other side in the Y direction relative to the image data Fu1 is referenced as the second image data in this case depends on the value imgNLy.

When the value imgNLy is a positive value, the second image data is located at ($\alpha$, $\beta$−1.5). Specifically, in this case, for the image data Fu1 at ($\alpha$, $\beta$) as the first image data, the second image data is the image data Fu4 aligned next to each other on the one side in the Y direction relative to the image data Fu1. When the value imgNLy is a negative value, the second image data is located at ($\alpha$, $\beta$+1.5). Specifically, in this case, while the image data Fu1 at ($\alpha$, $\beta$) is the first image data, the second image data is image data located on the other side in the Y direction relative to the image data Fu1. The image data located on the other side is image data at a position line symmetric to the image data Fu4 with respect to the image data Fu1 in the Y direction.

When the value imgNLy is zero, the same processing as in a case where the value imgNLy is a positive value may be performed or the same processing as in a case where the value imgNLy is a negative value may be performed. In the embodiment, when the value imgNLy is zero, the same processing as in a case where the value imgNLy is a positive value is performed.

The following describes a case where the first decimal place value of the value imgNLx is 5 and the first decimal place value of the value imgNLy is 5. In this case, two pieces of image data aligned next to each other in an oblique direction intersecting the X and Y directions are referenced in interpolation processing. Whether the oblique direction is aligned along the arrangement direction of the image data Fu1 and the image data Fu6 or the arrangement direction of the image data Fu1 and the image data Fu8 illustrated in FIG. 21 depends on the sign of the relative angle "rot".

FIG. 22 is a diagram illustrating the relation between the relative angle "rot" and the midline CLY of the face HF relative to the Y direction of the display panel 20A. As described above, when the relative angle "rot" is a positive number, it is meant that the midline CLY of the face HF is oriented to form an angle in the clockwise direction with respect to the Y direction of the display panel 20A. When the relative angle "rot" is a negative number, it is meant that the midline CLY of the face HF is oriented to form an angle in the anticlockwise direction with respect to the Y direction of the display panel 20A.

The following first describes a case where two pieces of image data aligned next to each other in an oblique direction intersecting the X and Y directions are referenced in interpolation processing and the relative angle "rot" is a positive number. In this case, when the value imgNLx is a positive value or zero and the value imgNLy is a positive value or zero, one of the two pieces of image data is located at ($\alpha$, β+1.5) and the other of the two pieces of image data is located at (α+1.5, B). In that case, when the value imgNLx is a positive value or zero and the value imgNLy is a negative value, one of the two pieces of image data is located at (α, β) and the other of the two pieces of image data is located at (α+1.5, β−1.5). In that case, when the value imgNLx is a negative value and the value imgNLy is a positive value or zero, one of the two pieces of image data is located at (α, β) and the other of the two pieces of image data is located at (α−1.5, β+1.5). In that case, when the value imgNLx is a negative value and the value imgNLy is a negative value, one of the two pieces of image data is located at (α−1.5, β) and the other of the two pieces of image data is located at (α, β−1.5).

The following describes a case where two pieces of image data aligned next to each other in an oblique direction intersecting the X and Y directions are referenced in interpolation processing and the relative angle "rot" is a negative number. In this case, when the value imgNLx is a positive value or zero and the value imgNLy is a positive value or zero, one of the two pieces of image data is located at (α, β) and the other of the two pieces of image data is located at (α+1.5, β+1.5). In that case, when the value imgNLx is a positive value or zero and the value imgNLy is a negative value, one of the two pieces of image data is located at (α+1.5, B) and the other of the two pieces of image data is located at (α, β−1.5). In that case, when the value imgNLx is a negative value and the value imgNLy is a positive value or zero, one of the two pieces of image data is located at (α, β+1.5) and the other of the two pieces of image data is located at (α−1.5, β). In that case, when the value imgNLx is a negative value and the value imgNLy is a negative value, one of the two pieces of image data is located at (α, β) and the other of the two pieces of image data is located at (α−1.5, β−1.5).

Interpolation processing based on various parameters derived from the coordinates (posL_x, posL_y, posL_h) of the viewpoint EL is described above. The following describes a case where the coordinates of the viewpoint EL are replaced with the coordinates of the viewpoint ER.

The coordinates of the viewpoint ER illustrated in FIG. 18 are (posR_x, posR_y, posR_h). The coordinates of a point CxR are (posR_x, V/2). The coordinates of a point CyR are (H/2, posR_y). These parameters can be derived by employing the same concept as for various parameters related to the coordinates of the viewpoint EL described above with reference to Expressions (9) to (17). However, D1×cos (rot), which is subtracted from pos_x in calculation of posL_x of the viewpoint EL, is added in calculation of posR_x of the viewpoint ER. D1×sin (rot), which is subtracted from pos_y in calculation of posL_y of the viewpoint EL, is added in calculation of posR_y of the viewpoint ER. Thus, Expressions (18) to (26) below hold.

$$posR\_x = pos\_x + D1 \times \cos(rot) \tag{18}$$

$$posR\_y = pos\_y + D1 \times \sin(rot) \tag{19}$$

$$posR\_h = pos\_h \tag{20}$$

$$ta\_R = posR\_x - H/2 \tag{21}$$

$$\tan(\theta R\_x) = (posR\_x - H/2)/posR\_h \tag{22}$$

$$\theta R\_x = \arctan((posR\_x - H/2)/posR\_h) \tag{23}$$

$$\theta R\_y = \arctan((posR\_y - V/2)/posR\_h) \tag{24}$$

-continued $$imgNRx = \operatorname{int}\{\theta R\_x/(Dlt\theta/2)\}/2 \tag{25}$$

$$imgNRy = \operatorname{int}\{\theta R\_y/(Dlt\theta/2)\}/2 \tag{26}$$

The above description related to the combination of the value imgNLx and the value imgNLy can be directly applied by replacing imgNLx with imgNRx and replacing imgNLy with imgNRy. Thus, with the combination of the value imgNRx and the value imgNRy, it is possible to identify two pieces of image data selected in accordance with the coordinates of the viewpoint ER and the relative angle "rot" and referenced in image data interpolation processing.

Figure 23:
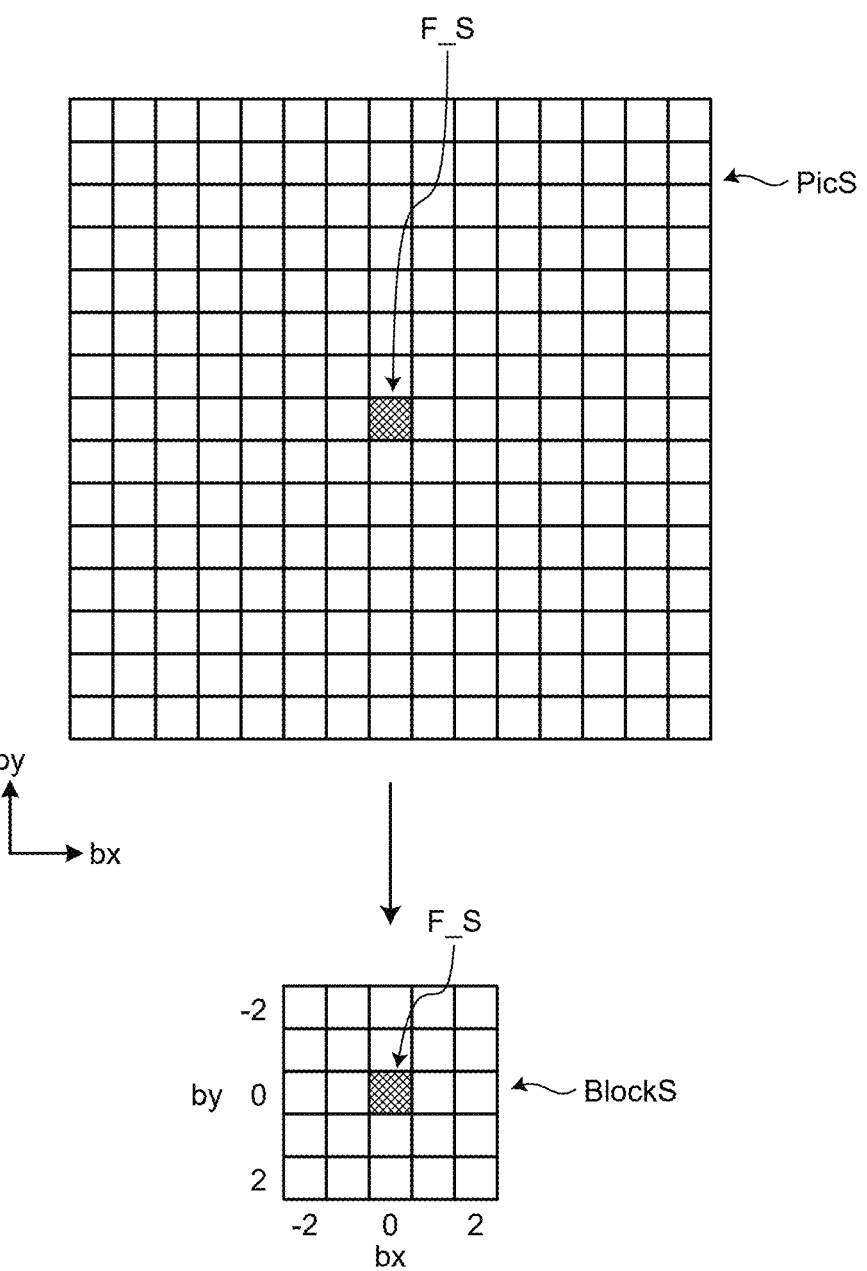
FIG. 23 is a diagram schematically illustrating a process of extracting a block BlockS from image data Pics as one of two pieces of image data referenced in image data interpolation processing.
Figure 24:
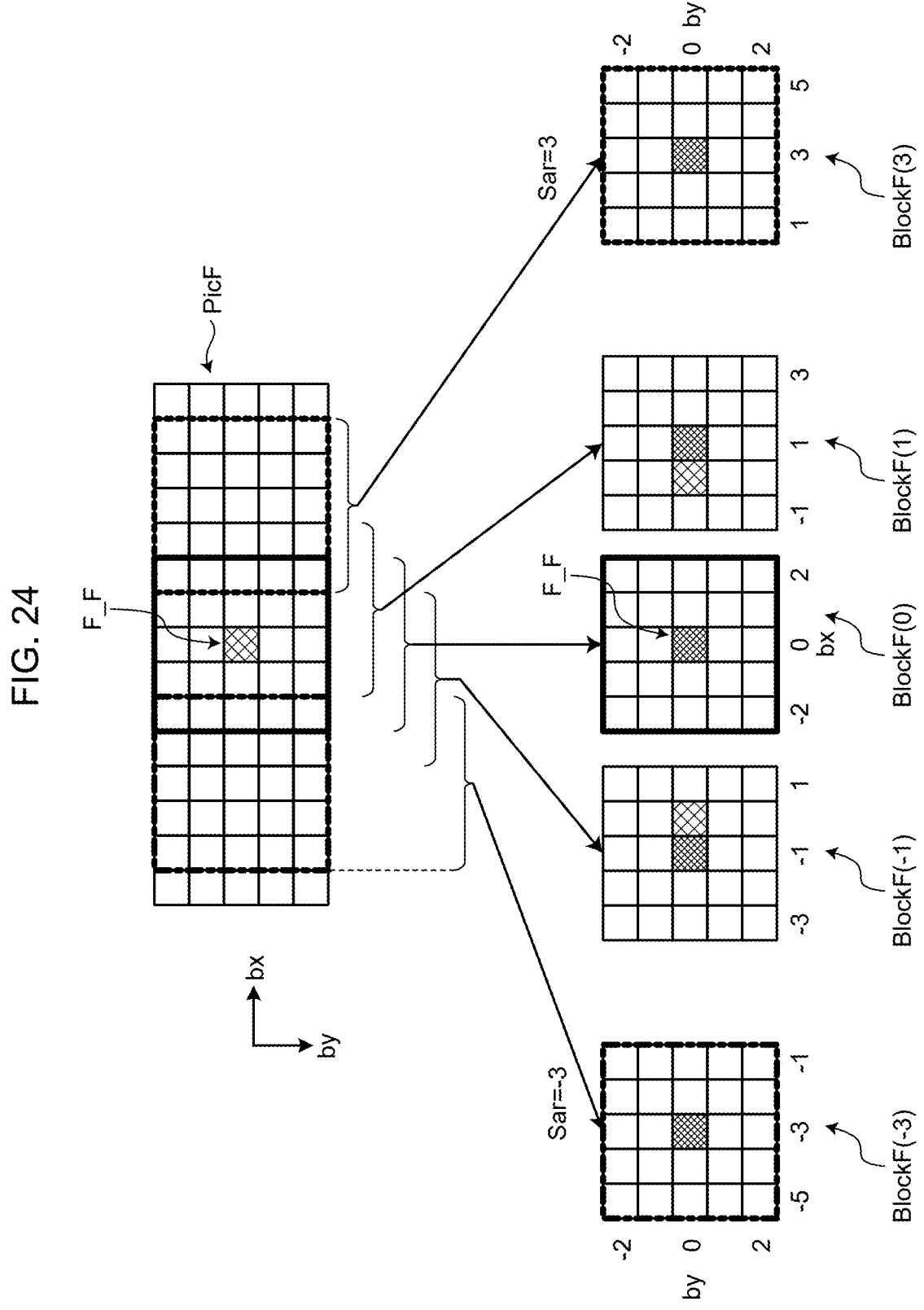
FIG. 24 is a schematic view illustrating blocks BlockF(–3) to BlockF(3) that are extracted from image data PicF as the other of the two pieces of image data referenced in image data interpolation processing and are subjected to block matching with the block Blocks.
Figure 25:
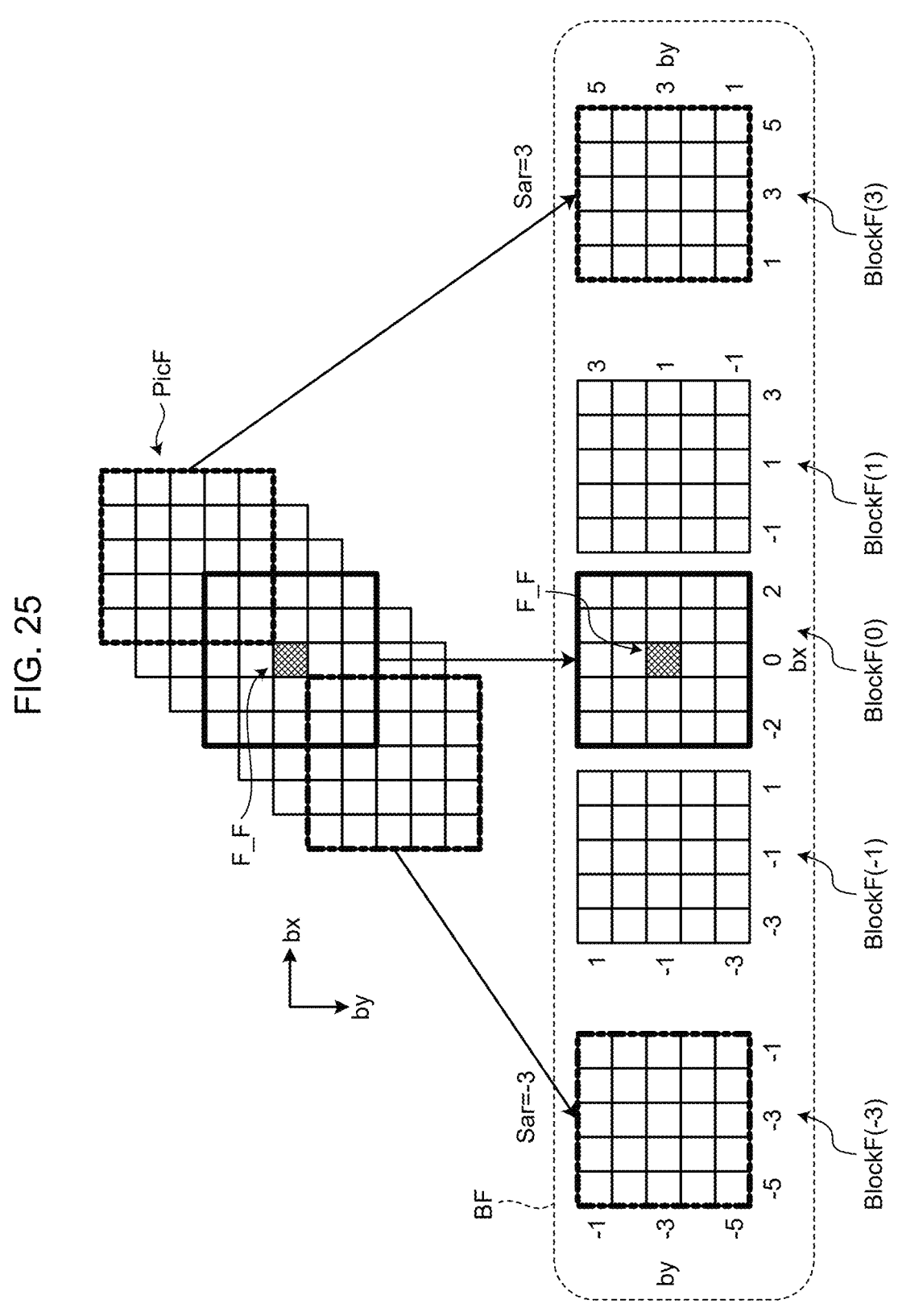
FIG. 25 is a schematic view illustrating the blocks BlockF (–3) to BlockF(3) that are extracted from the image data PicF as the other of the two pieces of image data referenced in image data interpolation processing and are subjected to block matching with the block BlockS.

The following describes a specific example of image data interpolation processing with reference to FIGS. 23 to 25. In the image data interpolation processing, block matching is performed in which each of a plurality of pieces of pixel data included in image data as one of two pieces of image data referenced in the interpolation processing is regarded as a center. The block matching will be described below with reference to FIGS. 23 to 25. Since the two pieces of image data used in the interpolation processing are similar pieces of image data with slightly different angles in one direction as described above, the block matching for interpolating therebetween can also be processed specifically in only the one direction, which simplifies image processing.

FIG. 23 is a diagram schematically illustrating a process of extracting a block BlockS from image data Pics as one of two pieces of image data referenced in image data interpolation processing. In the image data interpolation processing, processing is individually performed for each of pieces of pixel data included in one of the two pieces of image data referenced in the interpolation processing. In this processing performed for each piece of pixel data, first, a block with the piece of the pixel data as a center is extracted. In FIG. 23, among a plurality of pieces of pixel data that are included in the image data Pics as one of the two pieces of image data referenced in the image data interpolation processing and are arranged in a matrix having a row-column configuration in the "bx" and "by" directions, a piece of pixel data to be subjected to individual processing is indicated as pixel data F_S. A block including 5×5=25 pieces of pixel data disposed in a region of +2 in the "bx" direction and ±2 in the "by" direction with the pixel data F_S as a center, is indicated as the block BlockS. In the embodiment, the block BlockS is extracted for processing related to the pixel data F_S. The product sum of the gradation values of a plurality of pieces of pixel data included in the block BlockS can be expressed as Expression (27) below.

$$BlockS = \sum_{bx,by}^{-2,2} S(x + bx, y + by) \tag{27}$$

The following describes, with reference to FIG. 24, a case where image data PicF as the other of the two pieces of image data referenced in the image data interpolation processing is located in the X direction relative to the image data Pics.

FIGS. 24 and 25 are schematic views illustrating blocks BlockF(−3) to BlockF(3) that are extracted from the image data PicF as the other of the two pieces of image data referenced in the image data interpolation processing and are subjected to block matching with the block BlockS.

In the image data PicF as the other of the two pieces of image data referenced in the image data interpolation processing, pixel data F_F is identified first. The position of the pixel data F_F in the image data PicF is the same as the position of the pixel data F_S in the image data Pics. Although not illustrated in FIG. 24, the numbers of pixels arranged in the "bx" and "by" directions in the actual image data PicF are the same as the numbers of pixels arranged in the "bx" and "by" directions in the image data Pics.

A pixel region centered on the pixel data F_F and having the same numbers of pixels arranged in the "bx" and "by" directions as in the block BlockS is handled as a block BlockF(0).

As an example, the coordinates of the pixel data F_S and the pixel data F_F are assumed to be (bx, by)=(0, 0). In this case, a "bx" coordinate of the pixel data positioned on one side in the "bx" direction among pixel data included in a pixel region of "bx"×"by"=5×5 is "2", and a "bx" coordinate of the pixel data positioned on the other side in the "bx" direction among the pixel data included in the pixel region is "−2". A "by" coordinate of the pixel data positioned on one side in the "by" direction among the pixel data included in the pixel region is "2", and a "by" coordinate of the pixel data positioned on the other side in the "by" direction among the pixel data included in the pixel region is "−2". Thus, the block BlockF(0) in FIG. 24 is illustrated as a pixel region centered on the pixel data F_F at (bx, by)=(0, 0) and having the "bx" coordinate in a range of "2" to "−2" and the "by" coordinate in a range of "2" to "−2".

From inside a pixel region of "bx"×"by"=25×25 in the range of ±three pixels in the "bx" direction with the block BlockF(0) as a center, six pixel regions each having the same numbers of pixels arranged in the "bx" and "by" directions as the block BlockF(0) are extracted in addition to the block BlockF(0). A block BlockF(Sar) is defined to be a pixel region at a position shifted by Λ pixels in the "bx" direction relative to the block BlockF(0), and a block BlockF(−Λ) is defined to be a pixel region at a position shifted by Λ pixels to the other side in the "bx" direction. The value Λ is a natural number in a range of 1 to 3. Thus, the six pixel regions extracted in addition to the block BlockF(0) can be expressed as a block BlockF(1), a block BlockF(2), a block BlockF(3), a block BlockF(−1), a block BlockF(−2), and a block BlockF(−3).

The block BlockF(1) is different from the block BlockF(0) in that the "bx" coordinate of the pixel data positioned on the one side in the "bx" direction among pixel data included in a pixel region of "bx"×"by"=5×5 with a center at the coordinates (bx, by)=(1, 0) is "3" and the "bx" coordinate of the pixel data positioned on the other side in the "bx" direction among the pixel data included in the pixel region is "−1". This is synonymous with that, in a case where Λ=1, a block BlockF(Λ) is different from the block BlockF(0) in that the "bx" coordinate of the pixel data positioned on the one side in the "bx" direction among pixel data included in a pixel region of "bx"×"by"=5×5 with a center at the coordinates (bx, by)=(0+Λ, 0) is "2+Λ" and the "bx" coordinate of the pixel data positioned on the other side in the "bx" direction among the pixel data included in the pixel region is "−2+Λ". Such difference between the block BlockF(Λ) and the block BlockF(0) is applied to a case of Λ=2 or 3 as well.

The block BlockF(−1) is different from the block BlockF(0) in that a "bx" coordinate of the pixel data positioned on the one side in the "bx" direction among pixel data included in a pixel region of "bx"×"by"=5×5 with a center at the coordinates (bx, by)=(−1, 0) is "1", and a "bx" coordinate of the pixel data positioned on the other side in the "bx" direction among the pixel data included in the pixel region is "−3". This is synonymous with that, in the case of Λ=1, the block BlockF(Λ) is different from the block BlockF(0) in that a "bx" coordinate of the pixel data positioned on the one side in the "bx" direction among pixel data included in a pixel region of "bx"×"by"=5×5 with a center at the coordinates (bx, by)=(0−Λ, 0) is "2−Λ", and a "bx" coordinate of the pixel data positioned on the other side in the "bx" direction among the pixel data included in the pixel region is "−2−Λ". Such difference between the block BlockF(Λ) and the block BlockF(0) is applied to a case of Λ=2 or 3 as well.

It should be noted that although illustration of blocks BlockF(±2) are omitted in FIG. 24, the blocks BlockF(±2) are extracted as well.

When "Sar" is an integer value in the range of −3 to 3 (−3≤Sar≤3), the product sum of the gradation values of a plurality of pieces of pixel data included in the block BlockF(Sar) can be expressed as Expression (28) below. When "Sar" is zero, the block BlockF(Sar) is the block BlockF(0). When "Sar" is a positive integer, the block BlockF(Sar) can be said to be the same as the block BlockF(Λ) described above. When "Sar" is a negative integer, the block BlockF(Sar) can be said to be the same as the block BlockF(−Λ) described above.

$$BlockF(Sar) = \sum\nolimits_{bx,by}^{-2,2} F(x + bx + Sar, y + by) \tag{28}$$

When the image data PicF as the other of the two pieces of image data referenced in the image data interpolation processing is located on the one side in the X direction relative to the image data Pics, the above-described product sum represented by Expression (28) is calculated individually for each of the cases where "Sar" is 3, 2, 1, and 0 and compared with the product sum represented by Expression (27). When the image data PicF as the other of the two pieces of image data referenced in the image data interpolation processing is located on the other side in the X direction relative to the image data Pics, the above-described product sum represented by Expression (28) is calculated individually for each of the cases where "Sar" is 0, −1, −2, and −3 and compared with the product sum represented by Expression (27). In either case, the product sum represented by Expression (28) is calculated, and then the value of "Sar" with which a product sum closest to the product sum represented by Expression (27) is calculated is selected as SarX. Then, pixel data generated in the image data interpolation processing is determined by Expression (29) below with the selected SarX, based on pixel data of one (above-described block BlockS) of the two pieces of image data referenced in the image data interpolation processing. In Expression (29), Out(x, y) represents pixel data generated in the image data interpolation processing. In Expression (29), InS(x, y) represents pixel data of the one (above-described block BlockS) of the two pieces of image data referenced in the image data interpolation processing. Thus, pixel data (x, y) generated in the image data interpolation processing can be said to be pixel data of one (above-described block BlockS) of the two pieces of image data referenced in the image data interpolation processing and located at a position shifted by "+SarX/2" in the "bx" direction from (bx, by)=(x, y). When "x+SarX/2" is not an integer value, half of the product sum of pixel data with two coordinates of two integer values closer to "x+SarX/2", in other words, half of the product sum of two pieces of pixel data InS(x+0.5+

SarX/2, y) and InS(x−0.5+SarX/2, y), is employed as the calculation result of Expression (29).

$$Out(x, y) = InS\left(x + SarX/2, y\right) \tag{29}$$

The above description with reference to FIG. 24 is made on the case where the image data PicF as the other of the two pieces of image data referenced in the image data interpolation processing is located on the one side in the X direction relative to the image data Pics. However, when the image data PicF as the other of the two pieces of image data referenced in the image data interpolation processing is located on the one side in the Y direction relative to the image data Pics, the product sum of the gradation values of a plurality of pieces of pixel data included in the block BlockF(Sar) is expressed as Expression (30) below. Expression (30) is different from Expression (28) in that "Sar" is added to not the "bx" coordinate but the "by" coordinate. Specifically, Expression (30) indicates that the arrangement direction of seven pixel regions represented by the block BlockF(Sar) with Sar, which is an integer value in the range of −3 to 3 (−3≤Sar≤3), is the "by" direction.

$$BlockF(Sar) = \sum_{bx,by}^{-2,2} F(x + bx, y + by + Sar) \tag{30}$$

When the image data PicF as the other of the two pieces of image data referenced in the image data interpolation processing is located on the one side in the Y direction relative to the image data Pics, the above-described product sum represented by Expression (30) is calculated individually for each of the cases where "Sar" is 3, 2, 1, 0 and compared with the product sum represented by Expression (27). When the image data PicF as the other of the two pieces of image data referenced in the image data interpolation processing is located on the other side in the Y direction relative to the image data Pics, the above-described product sum represented by Expression (30) is calculated individually for each of the cases where "Sar" is 0, −1, −2, and −3 and compared with the product sum represented by Expression (27). In either case, the product sum represented by Expression (30) is calculated, and the value of "Sar" with which a product sum closest to the product sum represented by Expression (27) is calculated is selected as SarY. Pixel data generated in the image data interpolation processing is determined by Expression (31) below with the selected SarY based on pixel data of one (above-described block BlockS) of the two pieces of image data referenced in the image data interpolation processing. When "y+SarY/2" is not an integer value, half of the product sum of pixel data with two coordinates of two integer values closer to y+SarY/2, in other words, half of the product sum of two pieces of pixel data InS(x, y+0.5+SarY/2) and InS(x, y−0.5+SarY/2), is employed as the calculation result of Expression (31). Accordingly, except for matters otherwise stated, the concept of the image data interpolation processing in a case where the image data PicF as the other of the two pieces of image data referenced in the image data interpolation processing is located on the one side in the Y direction relative to the image data Pics, is the same as the concept of the image data interpolation processing in a case where the image data PicF as the other of the two pieces of image data referenced in the image data interpolation processing is located on the one side in the X direction relative to the image data Pics, which is described above with reference to FIG. 24.

$$Out(x, y) = InS\left(x, y + SarY/2\right) \tag{31}$$

The following describes, with reference to FIG. 25, a case where the image data PicF as the other of the two pieces of image data referenced in the image data interpolation processing is located in an oblique direction intersecting the X and Y directions relative to the image data Pics.

In the case of the oblique direction, an expression of the product sum is determined so that the coordinates in the "bx" and "by" directions both change with the one variable Sar. When the oblique direction, which is the arrangement direction of the two pieces of image data referenced in the image data interpolation processing, is an arrangement direction illustrated in FIG. 25, in other words, when the arrangement direction of the blocks BlockF(Sar) with the block BlockF (0) as a center can be expressed as a direction in which the coordinates in both the "bx" and "by" directions increase as the value of "Sar" increases, the product sum expression can be given by Expression (32) below.

$$BlockF(Sar) = \sum_{bx,by}^{-2,2} F(x + bx - Sar, y + by + Sar) \tag{32}$$

The above-described product sum represented by Expression (32) is calculated individually for each of the cases where "Sar" is an integer value of −3 to 3 and compared with the product sum represented by Expression (27), and the value of "Sar" with which a product sum closest to the product sum represented by Expression (27) is calculated is selected as SarZ. Pixel data generated in the image data interpolation processing is determined by Expression (33) below with the selected SarZ based on pixel data of one (above-described block BlockS) of the two pieces of image data referenced in the image data interpolation processing. When SarZ/2 is not an integer value, half of the product sum of pixel data with two coordinates of two integer values closer to the value on the right side of the equation, in other words, half of the product sum of two pieces of pixel data InS(x+0.5+SarZ/2, y+0.5−SarZ/2) and InS(x+0.5−SarZ/2, y−0.5−Sarz/2), is employed as the calculation result of Expression (33).

$$Out(x, y) = InS\left(x + SarZ/2, y - SarZ/2\right) \tag{33}$$

When the oblique direction, which is the arrangement direction of the two pieces of image data referenced in the image data interpolation processing, is different from the arrangement direction illustrated in FIG. 25, in other words, when the arrangement direction of the blocks BlockF(Sar) with the block BlockF(0) as a center can be expressed as a direction in which the coordinate in the "bx" direction increases as the value of "Sar" increases and the coordinate in the "by" direction decreases as the value of "Sar" increases, the product sum expression can be expressed as Expression (34) below.

$$BlockF(Sar) = \sum_{bx,by}^{-2,2} F(x + bx - Sar, y + by - Sar) \tag{34}$$

The above-described product sum represented by Expression (34) is calculated individually for each of the cases where "Sar" is an integer value of −3 to 3 and compared with the product sum represented by Expression (27), and the value of "Sar" with which a product sum closest to the product sum represented by Expression (27) is calculated is selected as SarZ. Pixel data generated in the image data interpolation processing is determined by Expression (35) below with the selected SarZ based on pixel data of one (above-described block BlockS) of the two pieces of image data referenced in the image data interpolation processing. When SarZ/2 is not an integer value, half of the product sum of pixel data with two coordinates of two integer values closer to the value on the right side, in other words, half of the product sum of two pieces of pixel data InS(x+0.5−SarZ/2, y+0.5+SarZ/2) and InS(x−0.5−SarZ/2, y−0.5+SarZ/2), is employed as the calculation result of Expression (33).

$$Out(x, y) = InS(x − SarZ/2, y + SarZ/2) \qquad (35)$$

Expressions (32) and (33) are employed when the relative angle "rot" is a negative number. Expressions (34) and (35) are employed when the relative angle "rot" is a positive number.

When the arrangement direction of the two pieces of image data referenced in the image data interpolation processing is the oblique direction, a product in a case of bx=by=0 may be given more weight than products in a case of bx and by that are other than zero, in the product sums calculated by Expressions (27), (32), and (34). Specifically, when the arrangement direction of the two pieces of image data referenced in the image data interpolation processing is the oblique direction, the product sums in Expressions (27), (32), and (34) may be calculated by replacing the value of a product in a case of bx=by=0 with "twice the value of the product in a case of bx=by=0". In other words, the product in a case of bx=by=0 may be given double the weight of products in a case of bx and by that are other than zero.

Accordingly, except for matters otherwise stated, the concept of the image data interpolation processing in a case where the image data PicF as the other of the two pieces of image data referenced in the image data interpolation processing is located in the oblique direction relative to the image data Pics, is the same as the concept of the image data interpolation processing in a case where the image data PicF as the other of the two pieces of image data referenced in the image data interpolation processing is located on the one side in the X direction relative to the image data Pics, which is described above with reference to FIG. 24.

The processing related to display output control in accordance with the relative positional relation between the display panel 20A and the face HF, which is described above with reference to FIGS. 13 to 25, is performed by the signal processor 10.

Figure 26:
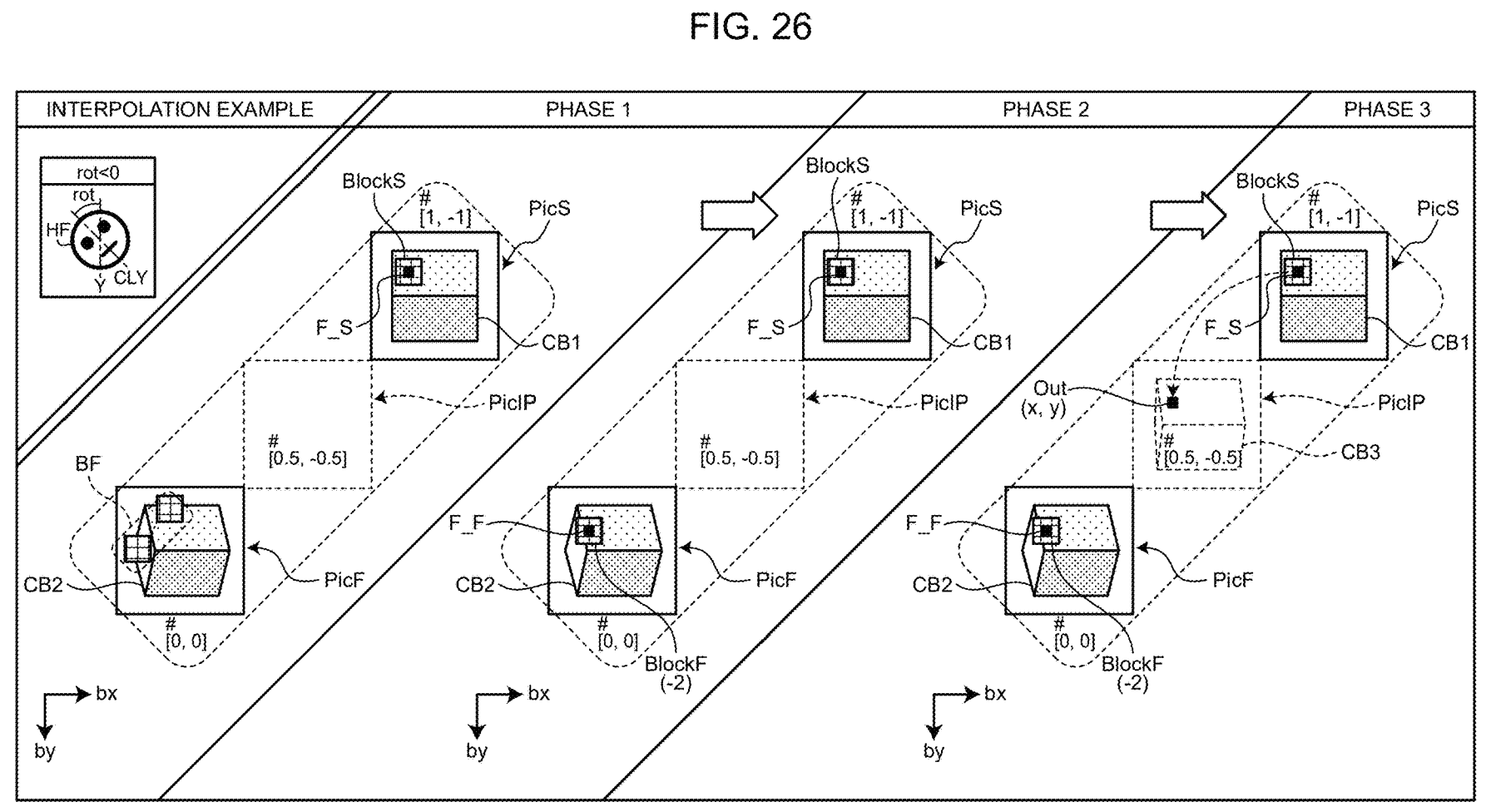

FIG. 26 is a diagram illustrating, as an interpolation example, an example of flow of processing performed as interpolation processing in the oblique direction in the case of rot<0. FIG. 26 illustrates an example in which image data PicIP is generated by interpolation processing that references two pieces of image data of the image data Pics and the image data PicF aligned in the oblique direction. The following description with reference to FIG. 26 will be made on Out(x, y) of the image data PicIP obtained based on one block BlockS in the image data Pics and a block group BF in the image data PicF at a position corresponding to the block BlockS. The block group BF in the image data PicF illustrated in "Phase 1" in FIG. 26 is a set of the blocks BlockF(Sar) in a case where the arrangement direction of the blocks BlockF(Sar) with the block BlockF(0) as a center can be expressed as a direction in which the coordinates in both the "bx" and "by" directions increase as the value of "Sar" increases, as illustrated in FIG. 25 as well. In this example, the cases where the value "Sar" is an integer value of −3 to 3 as described above are assumed.

"Phase 2" in FIG. 26 illustrates an example in which Block (−2) is selected from among the blocks BlockF(Sar) indicated as the block group BF in "Phase 1". Specifically, in the example illustrated in FIG. 26, the above-described product sum represented by Expression (32) is calculated individually for each of the blocks BlockF(Sar) with "Sar" of −3 to 3 included in the block group BF in "Phase 1" and compared with the product sum represented by Expression (27), and as a result, the value of "Sar" with which a product sum closest to the product sum represented by Expression (27) is calculated is −2. In other words, "Phase 2" illustrates the case of SarZ=−2.

"Phase 3" in FIG. 26 illustrates that Out(x, y) calculated by applying SarZ=−2 selected in "Phase 2" to Expression (33) described above is applied to the image data PicIP. Although the above description is made on Out(x, y) of the image data PicIP obtained based on one block BlockS and the block group BF in the image data PicF at a position corresponding to the block BlockS, the image data PicIP is obtained by applying processing of the same process to all pixel data F_S included in the block BlockS. Thus, an intermediate cube image CB3 between a cube image CB1 drawn with the block BlockS and a cube image CB2 drawn with the block BlockF is drawn with the image data PicIP, which is illustrated in "Phase 3".

As described above, according to the embodiment, the display device 1 includes: a display panel (for example, display panel 20 or display panel 20A) provided with a plurality of pixels (for example, pixels Pix); a light source (for example, light source 30) provided with a plurality of light emission points (light emission points LP; light emission points 32 as a specific example) and configured to emit light to the pixels of the display panel; an acquirer (for example, image capturer 2, distance measurer 3, gyro sensor 4, and sight line following circuit 11) configured to acquire information related to the viewpoints of a user visually recognizing the display panel; a storage (for example, storage 12a) configured to store a plurality of pieces of image data provided to be selectable in accordance with the positional relation between the display panel and the viewpoints; and a controller (for example, image output circuit 12) configured to control image display through operation of the pixels based on the information. The information includes information (for example, pos_x, pos_y, pos_h) related to the positions of a plurality of viewpoints (for example, first viewpoint E1 and second viewpoint E2, or first viewpoint EC and second viewpoint ED) and information (relative angle "rot") indicating the arrangement direction of the viewpoints. The controller drives some or all pixels (pixels Pix enclosing the pass-through point UP) positioned at least on straight lines connecting the light emission points and the viewpoints, based on the angle (relative angle "rot") between a predetermined direction (for example, X direction) of the display panel and the arrangement direction and the positional relation between each viewpoint and each light emission point, thereby transmitting light. The controller includes an image generator (for example, image generator 12b). When image data corresponding to the positional relation between the display panel and the viewpoints is not stored in the storage, the controller causes the image generator to generate image data corresponding to the positional relation in an interpolated manner from two pieces of image data close to the positional relation and selects the image data generated by the image generator in this case. The ratio of the pitch between the pixels arranged in the predetermined direction and the pitch between the light emission points arranged in the predetermined direction is 1:4n or 1:6n (for example, 1:6), and n is a natural number. Accordingly, the controller can perform image display based on information related to the user's viewpoints and thus can more flexibly adapt the relation between the arrangement direction of the viewpoints and the display device 1. When image data corresponding to the positional relation between the display panel and the viewpoints is not stored in the storage, image data corresponding to the positional relation is generated in an interpolated manner from two pieces of image data stored in the storage and close to the positional relation, and thus it is possible to more highly accurately adapt displayed images to the positional relation between the display device 1 and the viewpoints.

The storage (for example, storage 12a) stores a plurality of pieces of image data corresponding to the positions of the user's viewpoints (for example, first viewpoint E1 and second viewpoint E2, or first viewpoint EC and second viewpoint ED) on an image display surface of the display panel (for example, display panel 20 or display panel 20A) at the plan view point, and the controller (for example, image output circuit 12) selects image data corresponding to the positions of the user's viewpoints at the plan view point, and accordingly, image data prepared in advance and corresponding to the positions of the user's viewpoints can be used. Thus, by more highly accurately adapting the image data prepared in advance to the positional relation between the display device 1 and the viewpoints, it is possible to more highly accurately adapt displayed images to the positional relation between the display device 1 and the viewpoints.

The storage (for example, storage 12a) stores a plurality of pieces of image data each corresponding to the magnitude of the angle between the image display surface of the display panel (for example, display panel 20 or display panel 20A) and the user's viewpoints when the vertical direction of the image display surface is defined as 0 degrees, and the controller (for example, image output circuit 12) selects image data corresponding to the angle between the image display surface and the user's viewpoints. Thus, image data prepared in advance and corresponding to the angle between the image display surface and the user's viewpoints can be used. Thus, by more highly accurately adapting the image data prepared in advance to the positional relation between the display device 1 and the viewpoints, it is possible to more highly accurately adapt displayed images to the positional relation between the display device 1 and the viewpoints.

The image generator (for example, image generator 12b) generates image data by performing block matching of two pieces of image data among the pieces of image data stored in the storage (for example, storage 12a). Thus, it is possible to generate image data more highly accurately corresponding to the positional relation through a clear process.

The acquirer includes an image capturer (for example, image capturer 2) configured to capture an image of the user, and a processor (for example, sight line following circuit 11) configured to identify the arrangement direction of the right and left eyes, the relative rotation angle between the display panel and the arrangement direction, and the positional relation for the right and left eyes of the user based on the captured image of the user. Accordingly, the viewpoint information of the user can be acquired from the captured image of the user.

The acquirer includes a distance measurer (for example, distance measurer 3) configured to measure the distance between the display panel (for example, display panel 20 or display panel 20A) and the user. Accordingly, the distance between the display panel and the user can be included in the viewpoint information of the user. Thus, it is possible to perform display output more highly accurately corresponding to the viewpoint position.

The pieces of image data stored in the storage (for example, storage 12a) each correspond to the magnitude of the angle between the image display surface of the display panel (for example, display panel 20 or display panel 20A) and the user's viewpoints (for example, first viewpoint E1 and second viewpoint E2, or first viewpoint EC and second viewpoint ED) when the vertical direction of the image display surface is defined as 0 degrees. Coordinates with respect to one piece of image data (for example, the center image data CP1) as a center are allocated to each piece of image data, wherein the one piece of image data is image data selected when the angle between the image display surface and the viewpoints is 0 degrees. The magnitude of the angle between the image display surface and the viewpoints is represented as the coordinates. When the distance between the display panel and the user is relatively long, and image data at coordinates closer to the center is selected as compared to a case where the distance is relatively short. Thus, the relation between the distance and the pieces of image data can be represented as coordinates, thereby more clearly performing control related to display.

Drawings referred in the above description illustrate examples the relative angle "rot" is 0 degrees (°), 45 degrees (°), and 90 degrees (°), but the relative angle "rot" is not limited to these angles and may be any angle in the range of −180 degrees (°) to 180 degrees (°) in accordance with the relation between the display panel 20A and the face HF.

Description with reference to FIGS. 4 to 15 is made on an example in which the correspondence relation between the pitch between pixels Pix and the pitch between light emission points LP is 1:6, but various kinds of control described above with reference to FIGS. 8 to 26 are also applicable to a case where the correspondence relation is 1:4 as illustrated in FIG. 3. The correspondence relation may be 1:6α or 1:4α. The coefficient α is a natural number. The center position of each light emission point LP is not limited to a position between two pixels Pix adjacent to each other at the plan view point. For example, the center position of a light emission point LP and the center position of a pixel Pix may overlap each other or have any other positional relation.

The sub pixels provided in each pixel Pix is, for example, a quadrilateral having a longitudinal direction along the Y direction, and a plurality of such sub pixels are arranged in the X direction to form a pixel Pix, but the specific form of sub pixels constituting each pixel Pix is not limited thereto. The arrangement of the sub pixels provided in one pixel Pix is not limited to an arrangement in the X direction but may be an arrangement in the Y direction or may be in a matrix having a row-column configuration. The shape of each sub pixel at the plan view point is limited to a quadrilateral shape but may be an optional shape. The number of sub pixels provided in one pixel Pix is freely set and may be, for example, three, two or less, or four or more.

It should be understood that the present disclosure provides any other effects achieved by aspects described above in the present embodiment, such as effects that are clear from the description of the present specification or effects that could be thought of by the skilled person in the art as appropriate.

What is claimed is:

1. A display device comprising:

a display panel provided with a plurality of pixels;

a light source provided with a plurality of light emission points and configured to emit light to the pixels of the display panel;

an acquirer configured to acquire information related to a plurality of viewpoints of a user viewing the display panel;

a storage configured to store a plurality of pieces of image data provided to be selectable in accordance with the positional relation between the display panel and the viewpoints; and a controller configured to control image display through operation of the pixels based on the information, wherein a ratio of a pitch between the pixels arranged in a predetermined direction and a pitch between the light emission points in the predetermined direction is 1:4n or 1:6n, n is a natural number, the information includes information related to the positions of the viewpoints and information indicating an arrangement direction of the viewpoints, and the controller selects, based on a relative rotation angle between the display panel and the arrangement direction and a relative positional relation between each viewpoint and each light emission point, one piece of image data corresponding to the relative positional relation between the pieces of image data stored in the storage; and displays the one piece of the image data by controlling some of the pixels to transmit light, which are located on straight lines connecting the light emission points and the viewpoints, the controller comprises an image generator, and when first image data corresponding to a first positional relation between an image display surface of the display panel and the viewpoints is not stored in the storage, the controller causes the image generator to generate, based on two pieces of image data corresponding to second positional relations close to the first positional relation among the pieces of image data stored in the storage, second image data corresponding to the first positional relation and selects the second image data.

2. The display device according to claim 1, wherein the storage stores a plurality of pieces of image data corresponding to the positions of the viewpoints on the image display surface of the display panel at a plan view point, and the controller selects image data corresponding to the positions of the viewpoints at the plan view point.

3. The display device according to claim 1, wherein the storage stores a plurality of pieces of image data corresponding to magnitude of an angle between the image display surface of the display panel and the viewpoints when a vertical direction of the image display surface is defined as 0 degrees, and the controller selects image data corresponding to the angle between the image display surface and the viewpoints.

4. The display device according to claim 1, wherein the image generator generates the second image data by performing block matching of the two pieces of image data.

5. The display device according to claim 1, wherein the acquirer includes an image capturer configured to capture an image of the user, and a processor configured to identify the arrangement direction, the relative rotation angle, and the relative positional relation for right and left eyes of the user based on the captured image of the user.

6. The display device according to claim 5, wherein the acquirer includes a distance measurer configured to measure a distance between the display panel and the user.

7. The display device according to claim 6, wherein the pieces of image data each correspond to the magnitude of the angle between the image display surface of the display panel and the viewpoints of the user when the vertical direction of the image display surface is defined as 0 degrees, coordinates with respect to one piece of image data as a center are allocated to each piece of image data, the one piece of image data is image data selected when the angle between the image display surface and the viewpoints of the user is 0 degrees, the magnitude of the angle between the image display surface and the viewpoints of the user is represented as the coordinates, and when the distance between the display panel and the user is relatively long, image data at coordinates closer to the center is selected as compared to a case where the distance is relatively short.

* * * * *